(12) United States Patent
Goto et al.

(10) Patent No.: US 8,555,302 B2
(45) Date of Patent: Oct. 8, 2013

(54) DISC CARTRIDGE FOR A PLURALITY OF DISCS

(75) Inventors: Naofumi Goto, Kanagawa (JP); Takeshi Kubo, Kanagawa (JP); Takeharu Takasawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 56 days.

(21) Appl. No.: 13/108,315

(22) Filed: May 16, 2011

(65) Prior Publication Data
US 2011/0296450 A1  Dec. 1, 2011

(30) Foreign Application Priority Data
May 25, 2010   (JP) ................................. 2010-119655

(51) Int. Cl.
| | | |
|---|---|---|
| G11B 21/08 | (2006.01) | |
| G11B 7/085 | (2006.01) | |
| G11B 23/03 | (2006.01) | |

(52) U.S. Cl.
USPC ................. 720/733; 369/30.4; 369/30.49

(58) Field of Classification Search
USPC ........... 720/725–737; 369/30.4–30.42, 30.48, 369/30.49, 30.52–30.54, 30.61, 369/30.65–30.69, 30.77, 30.78, 30.83, 369/30.84; 360/99.13, 99.14
See application file for complete search history.

(56) References Cited

U.S. PATENT DOCUMENTS

| | | | | |
|---|---|---|---|---|
| 4,701,900 A | * | 10/1987 | Hasegawa et al. | ......... 369/30.84 |
| 5,576,911 A | * | 11/1996 | Porter | ........................ 360/98.06 |
| 5,748,609 A | * | 5/1998 | Tanaka | ........................... 720/735 |
| 5,764,616 A | * | 6/1998 | Kim et al. | .................... 369/30.92 |
| 5,828,645 A | * | 10/1998 | Kim et al. | .................... 369/30.78 |
| 5,862,109 A | * | 1/1999 | Nakamichi | ................ 369/30.85 |
| 7,159,229 B2 | | 1/2007 | Inoue et al. | |
| 7,533,397 B2 | | 5/2009 | Ohgi | |
| 2002/0024895 A1 | * | 2/2002 | Takizawa et al. | ........... 369/30.77 |
| 2003/0012089 A1 | * | 1/2003 | Fujimoto | ..................... 369/30.82 |
| 2005/0076356 A1 | * | 4/2005 | Yamada et al. | ................ 720/726 |
| 2005/0144627 A1 | * | 6/2005 | Kim et al. | ....................... 720/614 |
| 2007/0192778 A1 | * | 8/2007 | Suzuki et al. | .................. 720/706 |
| 2007/0201320 A1 | * | 8/2007 | Suzuki et al. | ............... 369/30.78 |
| 2011/0119691 A1 | | 5/2011 | Goto et al. | |
| 2011/0119693 A1 | | 5/2011 | Takasawa et al. | |
| 2011/0225602 A1 | * | 9/2011 | Kubo et al. | .................... 720/636 |
| 2011/0296449 A1 | | 12/2011 | Goto et al. | |
| 2011/0296451 A1 | | 12/2011 | Goto et al. | |

FOREIGN PATENT DOCUMENTS

JP    63-029392    2/1988

* cited by examiner

*Primary Examiner* — Wayne Young
*Assistant Examiner* — Adam B Dravininkas
(74) *Attorney, Agent, or Firm* — Wolf, Greenfield & Sacks, P.C.

(57) ABSTRACT

A disc cartridge includes a case body in which a plurality of disc-shaped recording media can be stored being arranged in the axial direction of a central shaft and which includes a first shell having a base face portion parallel to a recording face of the recording medium and a second shell having a basal plane portion parallel to the recording face, which move toward or away from each other in the axial direction, thereby being combined with or separated from each other, wherein the second shell has a pair of side face portions protruding in the same direction from both end portions of the basal plane portion and situated facing each other, a thin-walled portion is formed at a central portion between the side face portions in the basal plane portion, and a bridge member which is attached to span the side face portions is provided.

16 Claims, 26 Drawing Sheets

DISC CARTRIDGE FOR A PLURALITY OF DISCS

BACKGROUND OF THE INVENTION

1. Field of the Invention

The present invention relates to a technical field regarding a disc cartridge. Specifically, the present invention relates to the technical field of attaining improvement in strength and improvement in positioning precision of a disc-shaped recording medium with respect to a case body by forming a thin-walled portion at a central portion between a pair of side face portions of a second shell in the case body and also providing a bridge member which spans the pair of side face portions.

2. Description of the Related Art

A disc cartridge is present in which a plurality of disc-shaped recording media can be stored being arranged in the axial direction of a central shaft in the inside. Such a disc cartridge is used in, for example, a disc player for music reproduction, and a desired disc-shaped recording medium is ejected by an ejection mechanism and a performance of music data recorded on the desired disc-shaped recording medium is then performed (refer to Japanese Unexamined Patent Application Publication No. 63-29392, for example).

Also, in recent years, the recording capacity of the disc-shaped recording medium has been significantly increased, whereby there has been a growing need for a disc cartridge in which a plurality of disc-shaped recording media having a large recording capacity can be stored being arranged in the axial direction of a central shaft and which is used in a data center or the like.

As for the disc cartridge as described above, there is a type in which each disc-shaped recording medium is stored in a state where outer circumferential portions thereof are inserted into a pair of holding grooves. Since such a type of disc cartridge does not use a disc tray which holds the disc-shaped recording media, a storage space is small, so that it is possible to attain a reduction in size, and also the number of stored discs increases, so that it is also possible to attain an increase in the amount of data which is preserved.

Also, in the disc cartridge, practical application of the disc cartridge of a type in which the case body has a first shell and a second shell that are separable from each other, and storage and ejection of the disc-shaped recording medium with respect to the case body are performed in the separated state of the first shell and the second shell, and which has pivotable locking levers that perform locking in the combined state of the first shell and the second shell, is considered.

SUMMARY OF THE INVENTION

Incidentally, in the disc cartridge as described above, in which the disc-shaped recording media are stored and retained in the inside of the case body, for example, if the first shell or the second shell comes into contact with the disc-shaped recording medium when the first shell and the second shell are separated from each other, the disc-shaped recording medium is damaged or destroyed, thereby presenting an obstacle to the retention of data.

Accordingly, it is necessary to position the disc-shaped recording medium, which is stored in the inside of the case body, at a predetermined position with high precision.

Also, if the strength of the case body is low, there is also concern that the case body may be deformed, so that unnecessary load is imparted to the disc-shaped recording medium, whereby the disc-shaped recording medium may be deformed.

Therefore, it is desirable to overcome the above-mentioned problems and attain improvement in strength and improvement in positioning precision of the disc-shaped recording medium with respect to the case body.

According to an embodiment of the present invention, there is provided a disc cartridge including: a case body in which a plurality of disc-shaped recording media can be stored being arranged in the axial direction of a central shaft in the inside and which includes a first shell having a base face portion parallel to a recording face of the disc-shaped recording medium and a second shell having a basal plane portion parallel to the recording face of the disc-shaped recording medium, which move toward or away from each other in the axial direction, thereby being combined with or separated from each other, wherein the second shell is provided with a pair of side face portions which is orthogonal to the basal plane portion, protrudes in the same direction from both end portions of the basal plane portion, and is situated facing each other, a thin-walled portion having a thinner thickness than the other portions is formed at the central portion between the pair of side face portions in the basal plane portion, and a bridge member which is attached to span the pair of side face portions is provided.

Accordingly, in the disc cartridge, deformation of the portions other than the thin-walled portion of the second shell is prevented and also the distance between the pair of side face portions is maintained constant by the bridge member.

In the above-described disc cartridge, it is preferable that a plurality of holding grooves, in which outer circumferential portions of the disc-shaped recording media are inserted, whereby the disc-shaped recording media are held, is formed in each of the inner surfaces of the pair of side face portions.

Since the distance between the side face portions is maintained constant by forming a plurality of holding grooves, in which the disc-shaped recording media are held, in the inner surfaces of the pair of side face portions, positional precision of the holding grooves is improved.

In the above-described disc cartridge, it is preferable that the second shell is formed from a resin material and the bridge member is formed from a metal material.

By forming the case body by a resin material and forming the bridge member by a metal material, the formability of the case body is increased and also the strength of the bridge member is increased.

In the above-described disc cartridge, it is preferable that the bridge member is provided with a spanning portion which is disposed between the pair of side face portions and a pair of bent portions which protrudes in the same orthogonal direction from both end portions in the arrangement direction of the side face portions of the spanning portion.

By providing the spanning portion and the pair of bent portions which protrudes in the same orthogonal direction from both end portions of the spanning portion at the bridge member, the strength of the bridge member is increased.

In the above-described disc cartridge, it is preferable that the leading end surfaces in a protruding direction from the basal plane portion of the pair of side face portions and a surface on the opposite side to the surface facing the basal plane portion of the bridge member are located on the same plane.

By making the leading end surfaces in a protruding direction from the basal plane portion of the pair of side face portions and a surface on the opposite side to the surface facing the basal plane portion of the bridge member be located on the same plane, the pair of side face portions is respectively pressed against both end surfaces of the spanning portion from the inside.

The disc cartridge according to an embodiment of the present invention includes a case body in which a plurality of disc-shaped recording media can be stored being arranged in the axial direction of a central shaft in the inside and which includes a first shell having a base face portion parallel to a recording face of the disc-shaped recording medium and a second shell having a basal plane portion parallel to the recording face of the disc-shaped recording medium, which move toward or away from each other in the axial direction, thereby being combined with or separated from each other, wherein the second shell is provided with a pair of side face portions which is orthogonal to the basal plane portion, protrudes in the same direction from both end portions of the basal plane portion, and is situated facing each other, a thin-walled portion having a thickness thinner than the other portions is formed at the central portion between the pair of side face portions in the basal plane portion, and a bridge member which is attached to span the pair of side face portions is provided.

Accordingly, since the high strength of the portions other than the thin-walled portion of the basal plane portion is secured, so that it is difficult for deformation to occur, and the side face portions are connected to each other by the bridge member, it is possible to secure the high strength of the second shell as a whole and it is also possible to attain further improvement in the positional precision between the pair of side face portions.

In the disc cartridge according to an embodiment of the present invention, a plurality of holding grooves, in which outer circumferential portions of the disc-shaped recording media are inserted, whereby the disc-shaped recording media are held, is formed in each of the inner surfaces of the pair of side face portions.

Accordingly, positional precision of the disc-shaped recording medium which is held in the holding grooves is improved, so that it is possible to secure the excellent holding state of the disc-shaped recording medium.

In the disc cartridge according to an embodiment of the present invention, the second shell is formed from a resin material and the bridge member is formed from a metal material.

Accordingly, it is possible to attain improvement in the formability of the second shell and it is also possible to secure further improvement in the strength of the second shell as a whole and further improvement in the positional precision between the pair of side face portions.

In the disc cartridge according to an embodiment of the present invention, the bridge member is provided with a spanning portion which is disposed between the pair of side face portions and a pair of bent portions which protrudes in the same orthogonal direction from both end portions in the arrangement direction of the side face portions of the spanning portion.

Accordingly, improvement in the strength of the bridge member is attained, so that further improvement in the strength of the second shell as a whole and further improvement in the positional precision of the side face portions can be attained.

In the disc cartridge according to an embodiment of the present invention, the leading end surfaces in a protruding direction from the basal plane portion of the pair of side face portions and a surface on the opposite side to the surface facing the basal plane portion of the bridge member are located on the same plane.

Accordingly, the pair of side face portions is respectively pressed against both end surfaces of the spanning portion from the inside, so that further improvement in the positional precision of the side face portions can be attained.

DESCRIPTION OF THE PREFERRED EMBODIMENTS

Figure 1:
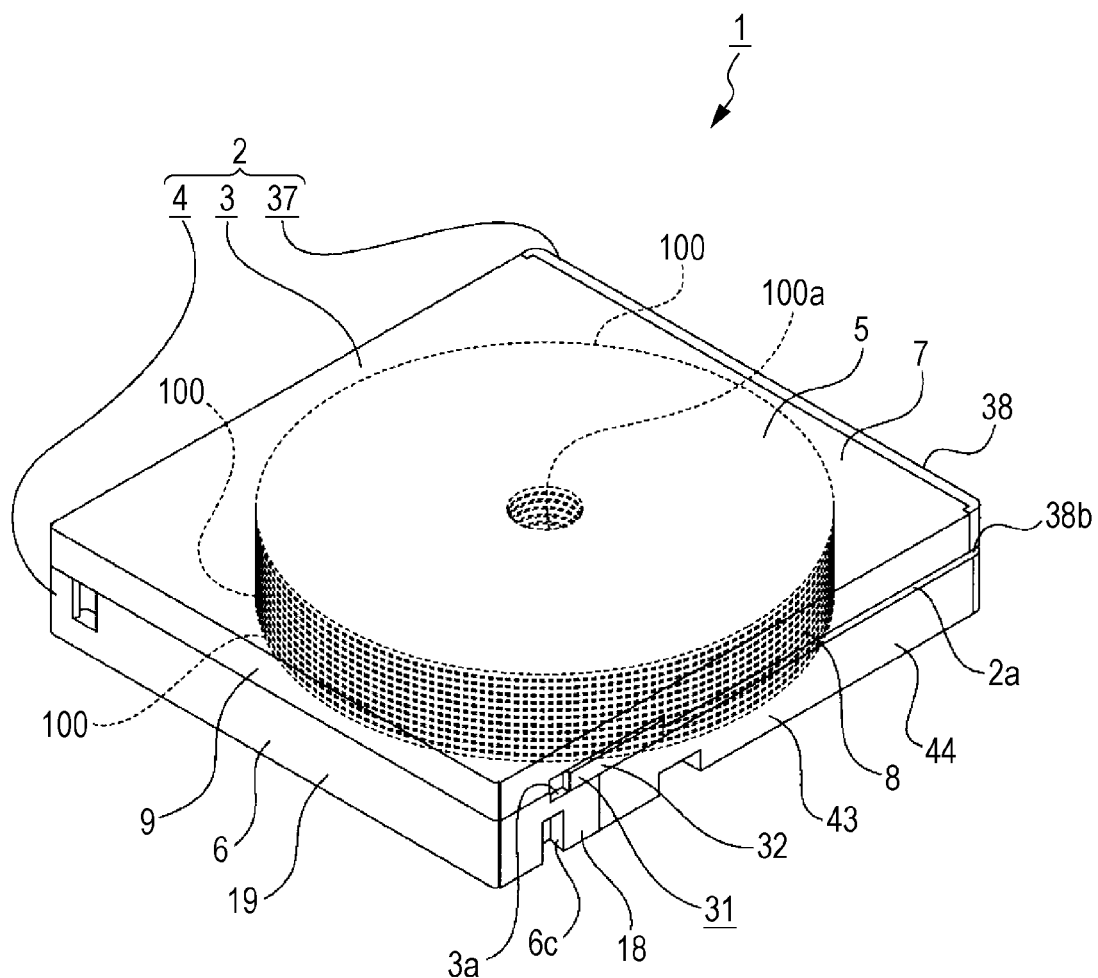
FIG. 1 illustrates a disc cartridge according to an embodiment of the present invention along with FIGS. 2 to 30 and is a perspective view of the disc cartridge.

Hereinafter, a disc cartridge according to an embodiment of the present invention will be described according to the accompanying drawings.

In the following description, the front-and-back, up-and-down, right-and-left directions are shown with the insertion direction of the disc cartridge into a cartridge insertion/ejection opening of a disc changer as the front.

Also, the front-and-back, up-and-down, right-and-left directions shown below are for convenience of explanation, and with regard to implementation of the present invention, directions are not limited to these directions.

Overall Configuration

The respective sections are disposed in the inside of a case body 2, whereby a disc cartridge 1 is constituted, and the case body 2 includes a first shell 3 and a second shell 4. In the inside of the case body 2, a plurality of disc-shaped recording media 100, 100, . . . can be stored at equal intervals in the up-and-down direction.

Figure 2:
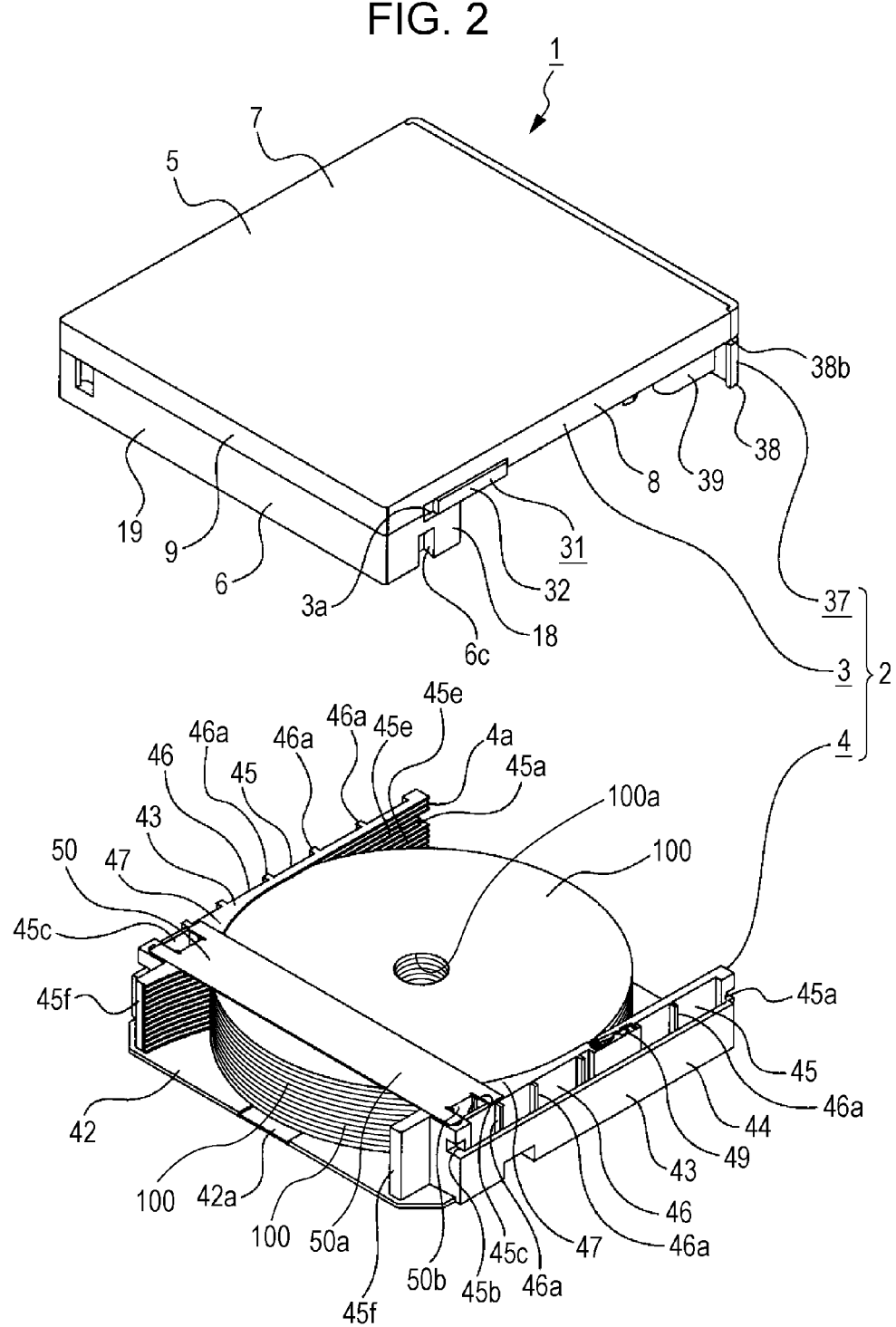
FIG. 2 is a perspective view of the disc cartridge illustrating the separated state of a first shell and a second shell.
Figure 3:
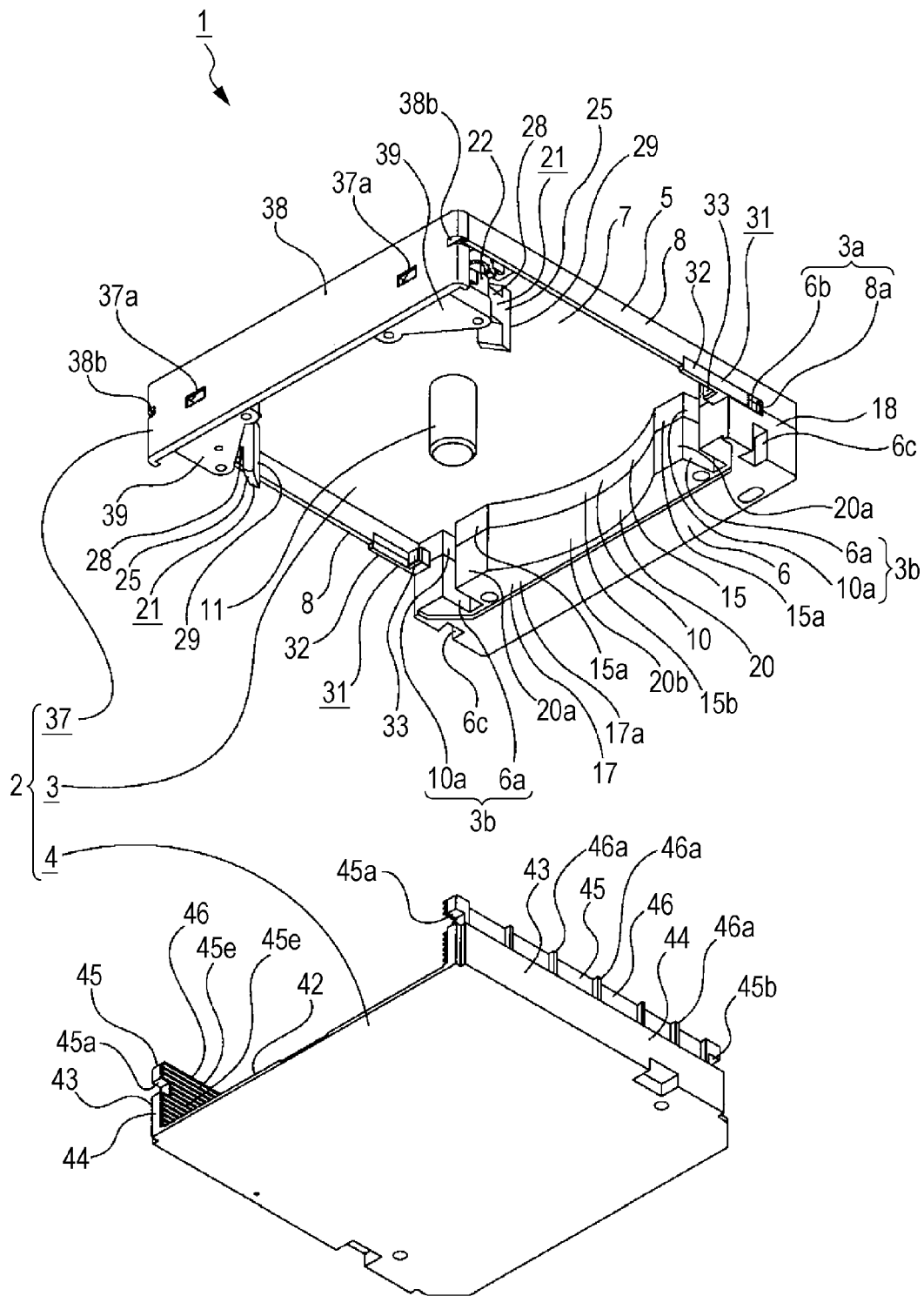
FIG. 3 is a perspective view of the disc cartridge illustrating the separated state of the first shell and the second shell in a state viewed from a direction different from FIG. 2.

The first shell 3 and the second shell 4 are made to be capable of being combined with or separated from each other, for example, in the up-and-down direction (refer to FIGS. 1 to 3). Also, in a case where the case body 2 is made to be long in the vertical direction, the first shell 3 and the second shell 4 are combined with or separated from each other in the right-and-left direction.

The first shell 3 is formed from a resin material, and includes a base body 5 and an auxiliary base 6 attached to a rear end portion of the base body 5, and the base body 5 and the auxiliary base 6 are combined with each other in the up-and-down direction.

Figure 4:
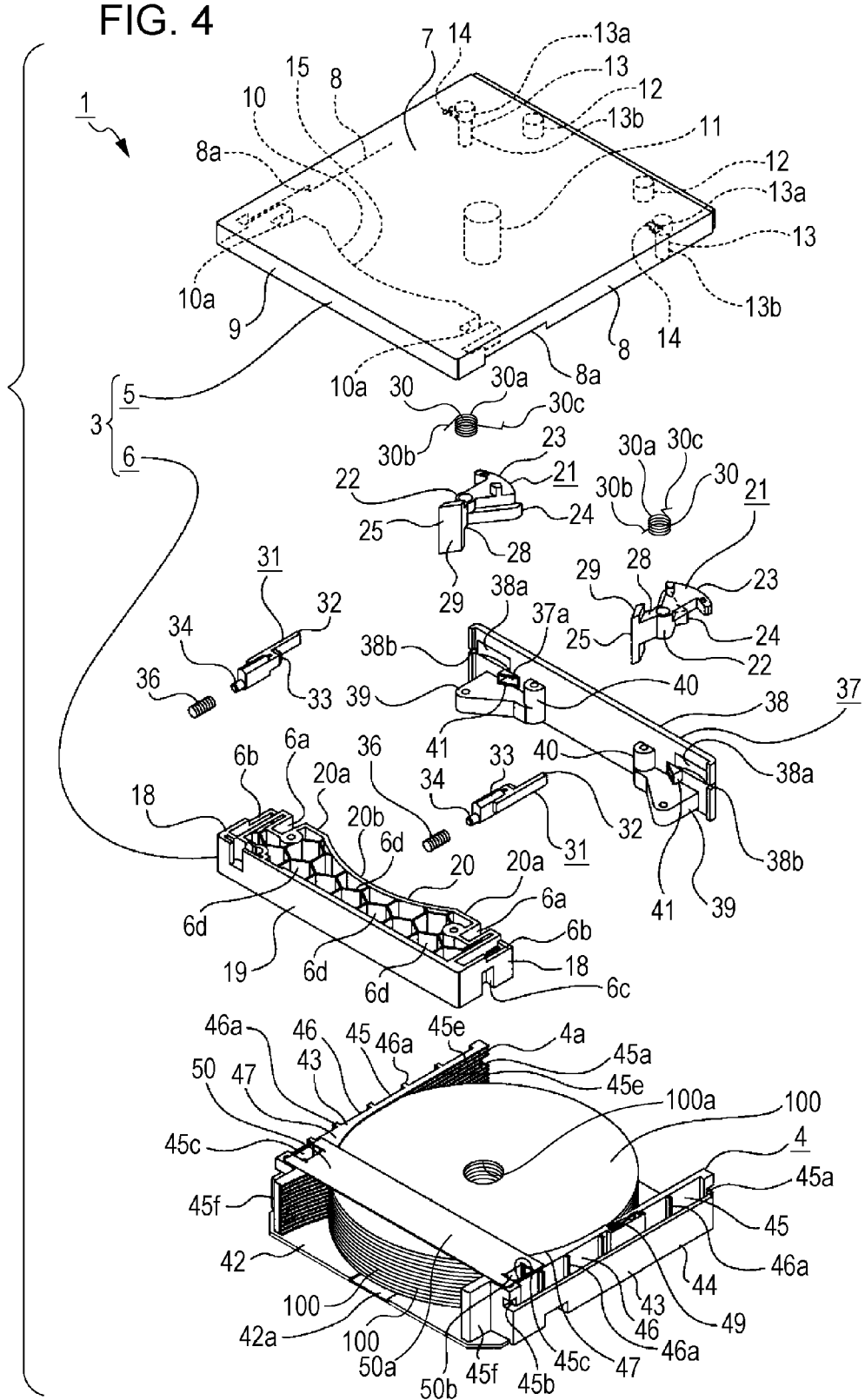
FIG. 4 is an exploded perspective view of the disc cartridge.
Figure 5:
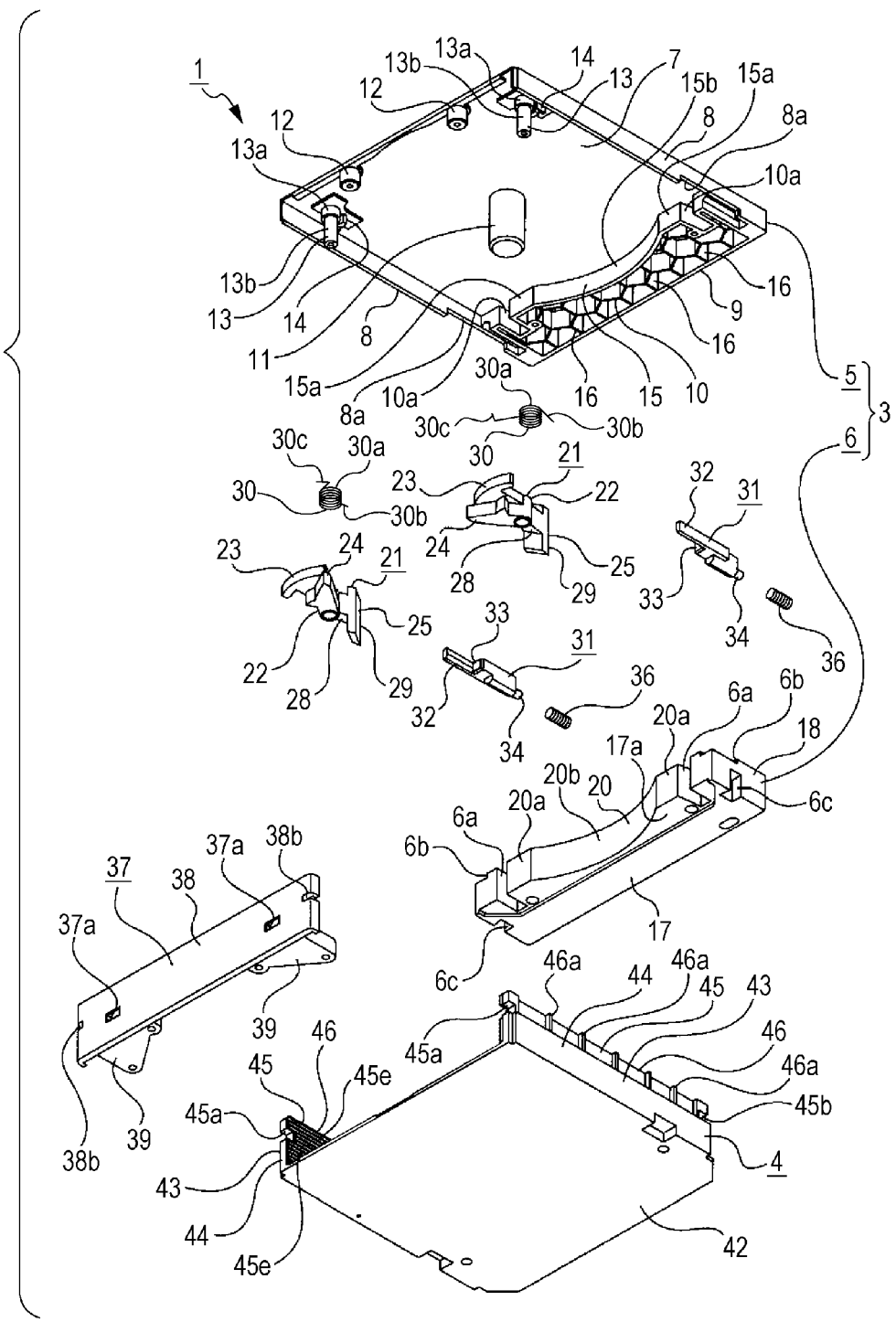
FIG. 5 is an exploded perspective view of the disc cartridge illustrated in a state viewed from a direction different from FIG. 4.

The base body 5 has a base face portion 7 which faces in the up-and-down direction, side face portions 8 and 8 which respectively protrude downward from both right and left end portions of the base face portion 7, a rear face portion 9 which protrudes downward from a rear end portion of the base face portion 7, and a reinforcing section 10 provided at a rear end portion on the lower surface side of the base face portion 7, as shown in FIGS. 4 and 5.

At a central portion of the base face portion 7, a round shaft-like center pin 11 which protrudes downward is provided. At a front end portion of the base face portion 7, screw fastening bosses 12 and 12 which protrude downward are provided being spaced from each other right and left.

At the position toward a front end of the base face portion 7, support shafts 13 and 13 which protrude downward are provided being spaced from each other right and left, and in the support shafts 13 and 13, the respective upper end portions are provided as spring support portions 13a and 13a and portions other than the upper end portion are provided as lever support portions 13b and 13b each having a smaller diameter than each of the spring support portions 13a and 13a. Spring hooking protrusions 14 and 14 are respectively provided at positions in the vicinity of the support shafts 13 and 13 in the lower surface of the base face portion 7.

At the positions toward the rear ends of the side face portions 8 and 8, support concave portions 8a and 8a which are respectively opened downward are formed.

The reinforcing section 10 includes an outer wall 15 which is located on the front side and faces in the horizontal direction, and a plurality of partition walls 16, 16, . . . provided at an area surrounded by the outer wall 15, the rear end portions of the side face portions 8 and 8, and the rear face portion 9, and is opened downward. The partition walls 16, 16, . . . are provided such that each end portion is continuous to the base face portion 7, the side face portions 8 and 8, the rear face portion 9, or the outer wall 15.

In the outer wall 15, both right and left end portions are respectively provided as planar surface portions 15a and 15a facing forward and a portion between the planar surface portions 15a and 15a is provided as a regulation portion 15b formed into a gentle circular arc shape which is concave forward. The curvature of the regulation portion 15b is made to be equal to the curvature of the outer circumferential surface of the disc-shaped recording medium 100.

In the reinforcing section 10, concave portions 10a and 10a opened forward and downward are respectively formed at both right and left sides of the regulation portion 15b.

The partition walls 16, 16, . . . are formed into, for example, a regular hexagonal shape or the shape of a portion thereof. However, the shape of each of the partition walls 16, 16, . . . is not limited to a regular hexagonal shape or the shape of a portion thereof, but is arbitrary as long as it is a shape where a space is created in the inside.

The auxiliary base 6 includes a laterally long bottom plate 17, side plates 18 and 18 which respectively protrude upward from both right and left end portions of the bottom plate 17, a rear plate 19 which protrudes upward from a rear end portion of the bottom plate 17, and a front plate 20 which protrudes upward from a front end portion of the bottom plate 17, and is opened upward. The auxiliary base 6 functions as a reinforcing section which reinforces the first shell 3 and thereby increases the strength of the first shell 3, similarly to the reinforcing section 10.

On the lower surface side of the rear end portion of the bottom plate 17, a shallow concave portion 17a is formed.

In the front plate 20, both right and left end portions are respectively provided as planar surface portions 20a and 20a facing forward, and a portion between the planar surface portions 20a and 20a is provided as a regulation portion 20b formed into a gentle circular arc shape which is concave forward. The front plate 20 is formed to have the same size and shape as those of the outer wall 15 of the reinforcing section 10 in the base body 5 of the first shell 3.

In the auxiliary base 6, concave portions 6a and 6a opened forward and upward are respectively formed at both right and left sides of the regulation portion 20b. In both right and left end portions of the auxiliary base 6, support concave portions 6b and 6b opened upward are respectively formed. In the lower end portions in both right and left end portions of the auxiliary base 6, groove-like gripping portions 6c and 6c opened laterally and downward are respectively formed.

In the inside of the auxiliary base 6, a plurality of partition walls 6d, 6d, . . . is provided. The partition walls 6d, 6d, . . . are provided to be continuous to the bottom plate 17, the side plates 18 and 18, the rear plate 19, and the front plate 20 and are formed to have the same size and shape as those of the partition walls 16, 16, . . . of the reinforcing section 10.

The auxiliary base 6 is attached to the base body 5 by screw fastening or the like. In a state where the auxiliary base 6 is attached to the base body 5, the partition walls 16, 16, . . . and the partition walls 6d, 6d, . . . are superimposed on each other, so that a plurality of spaces is formed in the inside. Also, the support concave portions 8a and 8a of the base body 5 and the support concave portions 6b and 6b of the auxiliary base 6 are located corresponding to each other up and down respectively, so that slider support portions 3a and 3a are respectively formed (refer to FIGS. 2 and 3). Further, the concave portions 10a and 10a of the base body 5 and the concave portions 6a and 6a of the auxiliary base 6 are located corresponding to each other up and down respectively, so that insertion concave portions 3b and 3b are respectively formed. Furthermore, the outer wall 15 of the base body 5 and the front plate 20 of the auxiliary base 6 are superimposed on each other.

On the support shafts 13 and 13 of the first shell 3, locking levers 21 and 21 are rotatably supported respectively (refer to FIGS. 3 to 5).

Figure 6:
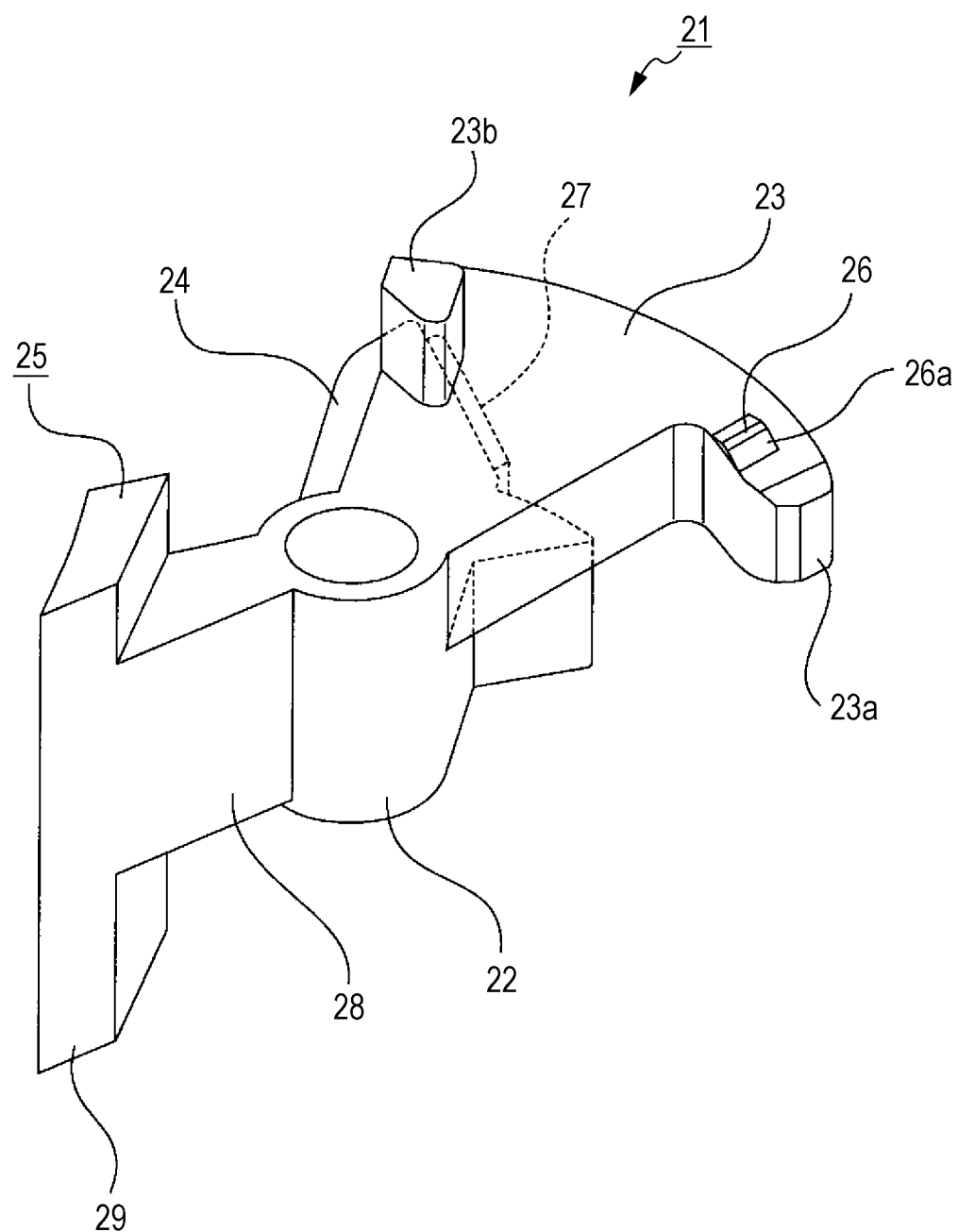
FIG. 6 is an enlarged perspective view of a locking lever.
Figure 7:
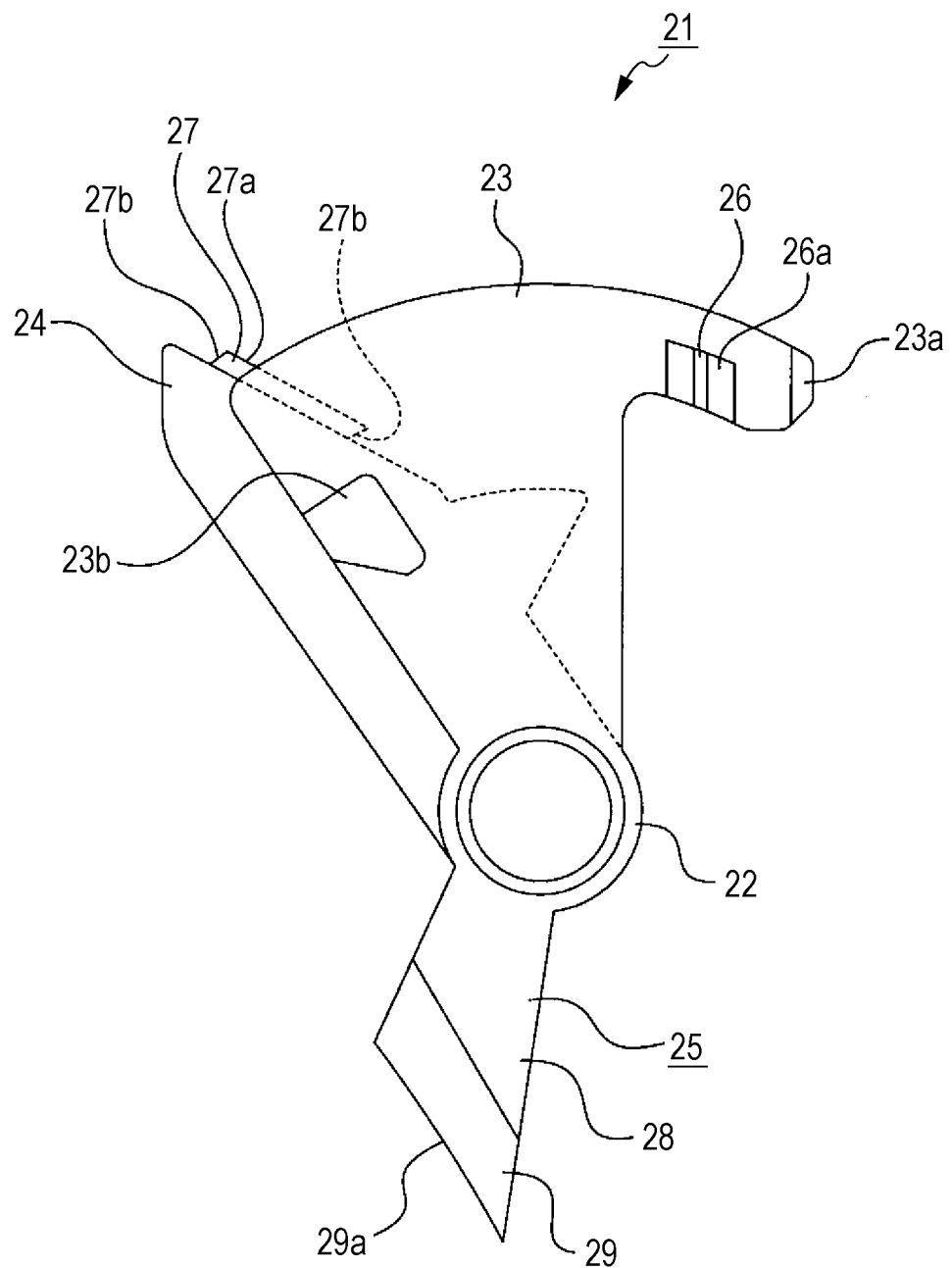
FIG. 7 is an enlarged plan view of the locking lever.

The locking lever 21 includes a cylindrical supported portion 22 in which the support shaft 13 is inserted and supported, a locking portion 23 which protrudes approximately forward from approximately the upper half of the supported portion 22, an unlocking portion 24 which protrudes obliquely forward from approximately the lower half of the supported portion 22, and a balance portion 25 which protrudes approximately backward from the supported portion 22, as shown in FIGS. 6 and 7.

The locking portion 23 is formed such that an outer circumferential surface (a surface on the front side) has a circular arc plane shape centered on the central axis of the supported portion 22, and has at a leading end portion a protrusion for locking 23a which protrudes laterally. The protrusion for locking 23a is formed into a tapered shape in which an outer shape becomes smaller as it goes to a leading end. In the locking portion 23, a convex portion 26 which protrudes upward is provided at the upper surface of the protrusion for locking 23a. The convex portion 26 has a sliding-contact surface 26a inclined so as to be displaced upward as it becomes more distant from the leading end of the protrusion for locking 23a.

At the locking portion 23, a spring support protrusion 23b which protrudes upward is provided.

At a leading end portion of the unlocking portion 24, a protrusion for insertion 27 is provided. The protrusion for insertion 27 is formed into a laterally long approximate plate shape and a leading end surface thereof is formed as an inclined surface 27a inclined in the right-and-left direction with respect to the front-and-back direction. Each of the right and left side surfaces 27b and 27b of the protrusion for insertion 27 is formed into a circular arc plane shape centered on the central axis of the supported portion 22.

The balance portion 25 includes a protrusion 28 which protrudes backward from the supported portion 22 and a protrusion for regulation 29 which protrudes vertically from a leading end portion of the protrusion 28. The rear surface of the protrusion for regulation 29 is formed as a regulation surface 29a formed into a circular arc plane shape which follows the outer circumferential surface of the disc-shaped recording medium 100.

Figure 8:
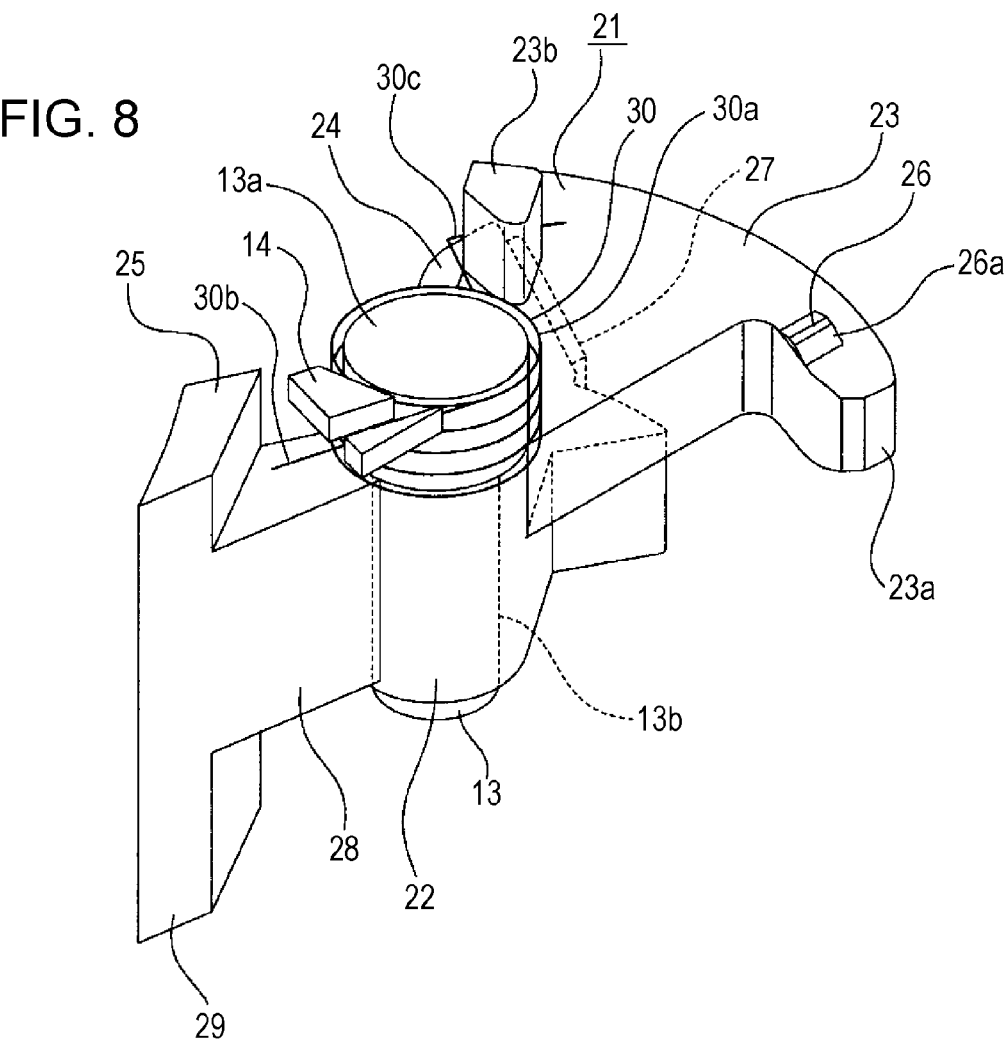
FIG. 8 is an enlarged perspective view illustrating along with a biasing spring the locking lever supported on a support shaft.

Each of the locking levers 21 and 21 is made to be capable of turning around the central axis of each of the support shaft 13 and 13 with each of the lever support shafts 13b and 13b of the support shafts 13 and 13 inserted into each of the supported portions 22 and 22 (refer to FIG. 8). In a state where the locking levers 21 and 21 are supported on the support shafts 13 and 13, the locking levers 21 and 21 are biased by biasing springs 30 and 30 in a direction in which the protrusions for locking 23a and 23a of the locking portions 23 and 23 respectively approach the side face portions 8 and 8.

The biasing spring 30 is, for example, a torsion coil spring and has a coil portion 30a and a pair of arm portions 30b and 30c which respectively protrude from the coil portion 30a. In the biasing spring 30, the coil portion 30a is supported on the spring support portion 13a of the support shaft 13, the arm portion 30b on one side is engaged with the spring hooking protrusion 14 provided at the base face portion 7 of the first shell 3, and the arm portion 30c on the other side is engaged with the spring support protrusion 23b provided at the locking portion 23 of the locking lever 21.

Locking sliders 31 and 31 are respectively supported on the slider support portions 3a and 3a of the first shell 3 so as to be capable of sliding in the front-and-back direction (refer to FIGS. 3 to 5).

Figure 9:
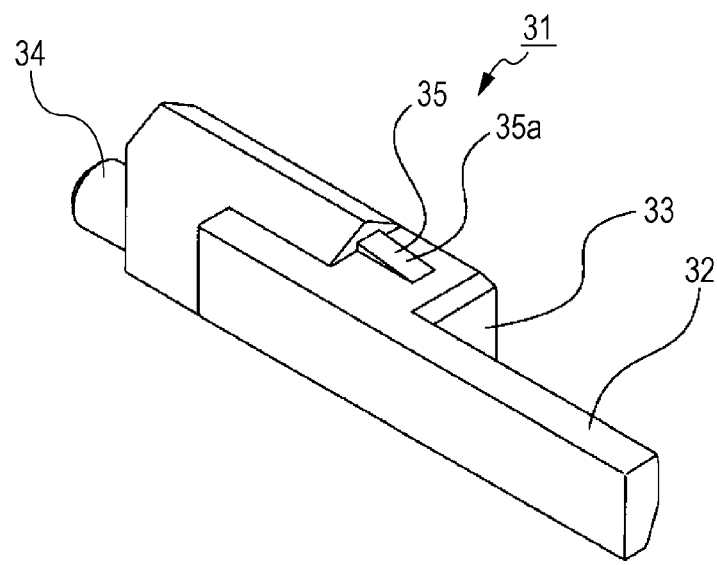
FIG. 9 is an enlarged perspective view of a locking slider.

The locking slider 31 has a supported portion 32 extending back and forth, a locking portion 33 which protrudes inward from a portion other than a front end portion of the supported portion 32, and a spring support shaft portion 34 which protrudes backward from the rear surface of the locking portion 33, as shown in FIG. 9. At the upper surface at the position toward a front end of the locking portion 33, a convex portion 35 which protrudes upward is provided. The convex portion 35 has a sliding-contact surface 35a inclined so as to be displaced upward as it goes backward.

In the locking sliders 31 and 31, each of the supported portions 32 and 32 is slidably supported on each of the slider support portions 3a and 3a of the first shell 3 and each of the coil springs 36 and 36 is supported on each of the spring support shaft portions 34 and 34. Both end portions of the coil spring 36 respectively come into contact with the rear surface of the locking portion 33 and a rear surface which forms the slider support portion 3a. Accordingly, the locking slider 31 is biased forward by the coil spring 36.

An opening and closing panel 37 is attached to a front end portion of the first shell 3 by screw fastening (refer to FIGS. 1 to 3). The opening and closing panel 37 has a panel portion 38 facing in the front-and-back direction and formed into a laterally long rectangular plate shape, attached protrusions 39 and 39 which protrude backward from a lower end portion of the rear surface of the panel portion 38, screw fastening portions 40 and 40 provided at the rear surface of the panel portion 38, and insertion portions 41 and 41 which protrude backward from the rear surface of the panel portion 38, as shown in FIGS. 4 and 5.

In the rear surface of the panel portion 38, concave portions for insertion 38a and 38a opened backward are formed being spaced from each other right and left. The concave portions for insertion 38a and 38a are formed as concave portions having a circular arc shape. In both right and left end portions of the panel portion 38, notches for insertion 38b and 38b opened outward are respectively formed.

The attached protrusions 39 and 39 are provided being spaced from each other right and left, the screw fastening portions 40 and 40 are provided being spaced from each other right and left inside the respective attached protrusions 39 and 39, and the insertion portions 41 and 41 are respectively provided at the upper sides of the attached protrusions 39 and 39.

The insertion portion 41 is formed into a triangular shape when viewed from the up-and-down direction and a leading end surface thereof is formed as an inclined surface 41a which approaches the panel portion 38 as it goes from the outside to the inside.

In the opening and closing panel 37, insertion holes 37a and 37a are formed being spaced from each other right and left. The insertion holes 37a and 37a are formed over the panel portion 38 and the insertion portions 41 and 41.

Leading end portions of the attached protrusions 39 and 39 are respectively screw-fastened to the lower surfaces of the support shafts 13 and 13 provided at the base face portion 7 and the screw fastening portions 40 and 40 are respectively screw-fastened to the lower surfaces of the screw fastening bosses 12 and 12 provided at the base face portion 7, whereby the opening and closing panel 37 is attached to the first shell 3.

In a state where the opening and closing panel 37 is attached to the first shell 3, the attached protrusions 39 and 39 are respectively screw-fastened below the support shafts 13 and 13, so that the locking levers 21 and 21 and the biasing springs 30 and 30 dropping out, which are supported on the support shafts 13 and 13, from the support shafts 13 and 13 is prevented. In a state where the attached protrusions 39 and 39 are respectively screw-fastened and attached below the support shafts 13 and 13, the upper surfaces of the attached protrusions 39 and 39 are located close to the lower surfaces of the locking portions 23 and 23 of the locking levers 21 and 21.

In a state where the opening and closing panel 37 is attached to the first shell 3, the unlocking portions 24 and 24 of the locking levers 21 and 21 are respectively located directly behind the insertion holes 37a and 37a.

Figure 10:
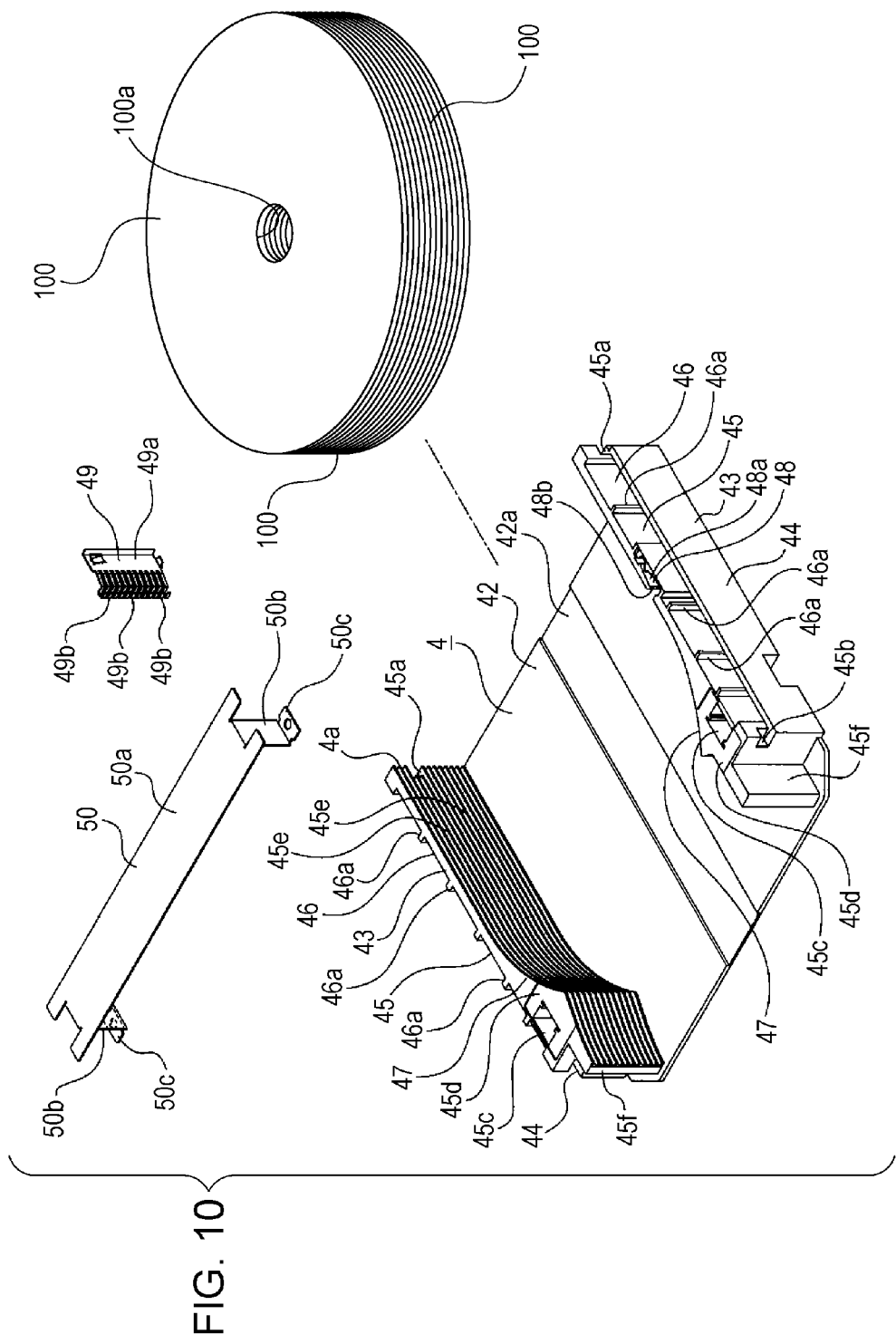
FIG. 10 is an exploded perspective view illustrating the second shell, a bridge member, a hold-down spring, and a disc-shaped recording medium.

The second shell 4 is formed from a resin material and includes a basal plane portion 42 facing in the up-and-down direction and side face portions 43 and 43 which respectively protrude upward from both right and left end portions of the basal plane portion 42, which are formed integrally with each other (refer to FIGS. 3, 5 and 10).

A central portion in the right-and-left direction of the basal plane portion 42 is provided as a thin-walled portion 42a slightly thinner in thickness than the other portions. The thin-walled portion 42a is formed as a stepped surface which is concave upward.

The side face portion 43 includes an outer wall portion 44 and an inner wall portion 45 which is located inside the outer wall portion 44, and a plurality of constant gaps spaced from each other back and forth is formed between the outer wall portion 44 and the inner wall portion 45.

The outer wall portion 44 has a height which is approximately half the height of the inner wall portion 45 and the upper surface thereof is located lower than the upper surface of the inner wall portion 45.

The inner wall portion 45 has a straight portion 46 which extends back and forth and a circular arc portion 47 formed into a circular arc shape which is continuous to the position toward the rear end of the straight portion 46 and is displaced inward as it goes backward.

A first concave portion for locking 45a opened forward and penetrating right and left is formed at the front end portion of the inner wall portion 45. A second concave portion for locking 45b opened backward and outward is formed at the position toward the rear end of the straight portion 46 of the inner wall portion 45.

An attachment hole 45c opened upward is formed at the position toward the rear end of the inner wall portion 45. On the upper surface of the inner wall portion 45, a stepped surface 45d which is slightly lower in height than other portions is formed at a portion around the attachment hole 45c.

Ribs 46a, 46a, . . . which are spaced from each other back and forth and extend vertically are provided at the outer surface of the straight portion 46 of the inner wall portion 45, and the outer surfaces of the ribs 46a, 46a, . . . are respectively continuous to the inner surface of the outer wall portion 44. The rear end portion of the inner wall portion 45 is provided as an insertion portion 45f which protrudes backward.

In the inner surface of the inner wall portion 45, holding grooves 45e, 45e, . . . are formed, and the holding grooves 45e, 45e, . . . are located being spaced at equal intervals in the up-and-down direction.

A spring mounting concave portion 48 is formed in the inner wall portion 45 on one side. The spring mounting concave portion 48 includes an insertion and mounting portion 48a opened upward and a concave portion for protrusion 48b opened upward and to the inner surface of the straight portion 46, and the concave portion for protrusion 48b is communicated with a rear end portion of the insertion and mounting portion 48a.

A hold-down spring 49 is inserted and mounted in the spring mounting concave portion 48 (refer to FIGS. 2 and 4). A vertically long plate-like mounted portion 49a and spring portions 49b, 49b, . . . which protrude from the rear edge of the mounted portion 49a are integrally formed from a metal material, whereby the hold-down spring 49 is constituted, as shown in FIG. 10. The spring portions 49b, 49b, . . . are provided being spaced at the same intervals as the vertical interval between the holding grooves 45e, 45e, . . . and at equal intervals in the up-and-down direction and provided in the same number as the holding grooves 45e, 45e, . . . .

The mounted portion 49a is inserted into the insertion and mounting portion 48a and the spring portions 49b, 49b, . . . are inserted into the concave portion for protrusion 48b, whereby the hold-down spring 49 is mounted in the spring mounting portion 48. In a state where the hold-down spring 49 is mounted in the spring mounting portion 48, leading end portions of the spring portions 49b, 49b, . . . protrude to the inside of the straight portion 46.

A bridge member 50 is attached between the side face portions 43 and 43 of the second shell 4 (refer to FIGS. 2 and 10).

The bridge member 50 is formed by bending a plate-like metal material into a given shape and has a spanning portion 50a extending right and left, bent portions 50b and 50b formed by being respectively bent downward from both right and left end portions of the spanning portion 50a, and attached surface portions 50c and 50c formed by being respectively bent outward from the lower edges of the bent portions 50b and 50b.

The bridge member 50 is made such that the thickness of the spanning portion 50a is the same as the depths of the stepped surfaces 45d and 45d formed at the inner wall portions 45 and 45 of the second shell 4.

Figure 11:
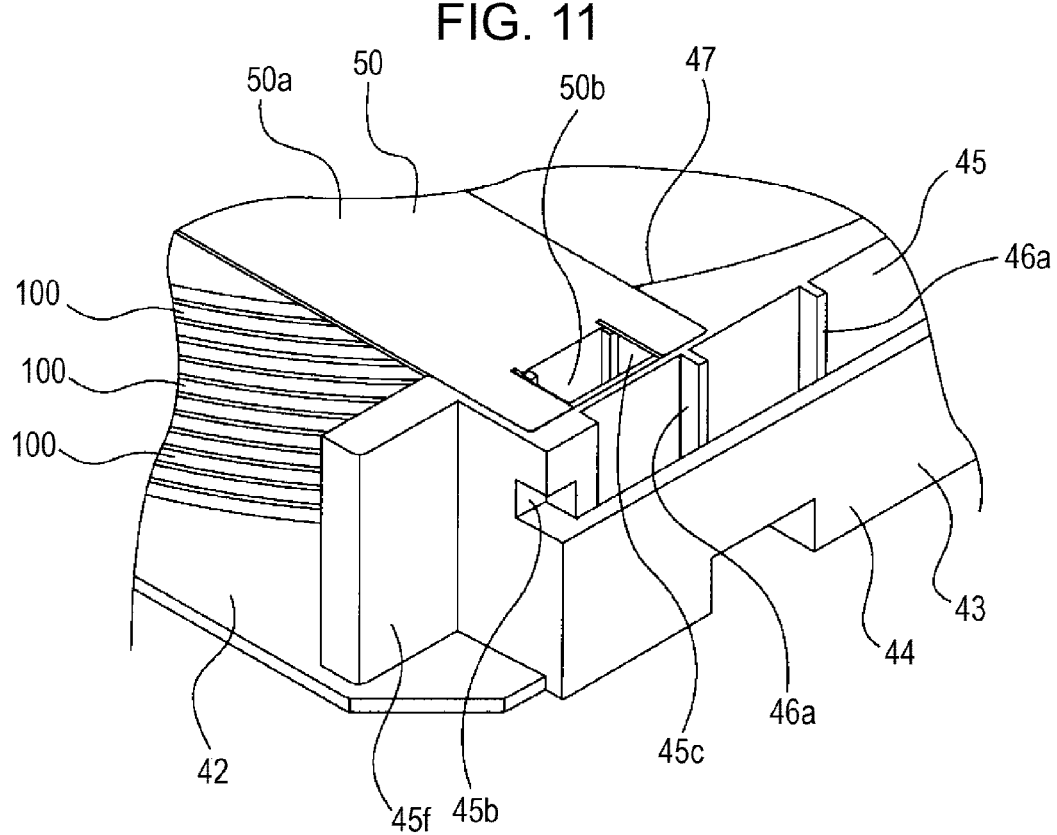
FIG. 11 is an enlarged perspective view illustrating a state where the bridge member is attached to the second shell.
Figure 12:
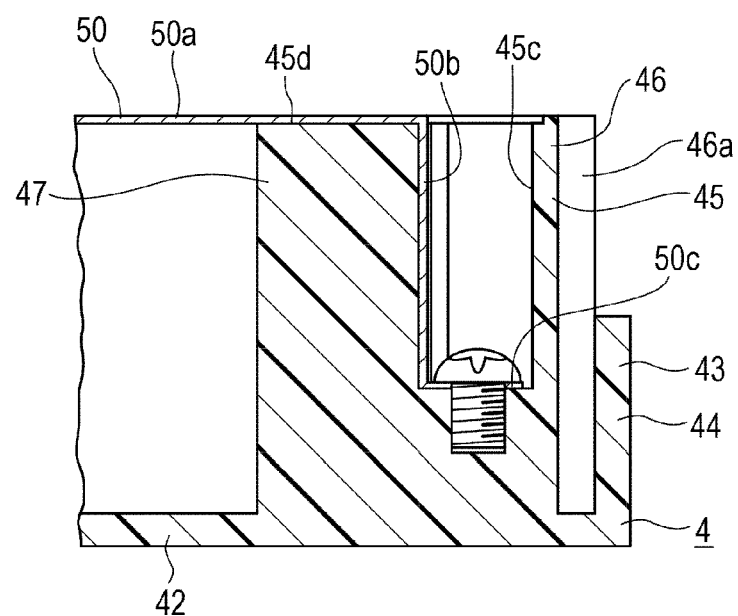
FIG. 12 is an enlarged cross-sectional view illustrating a state where the bridge member is attached to the second shell.

In the bridge member 50, the bent portions 50b and 50b and the attached surface portions 50c and 50c are respectively inserted into the attachment holes 45c and 45c of the inner wall portions 45 and 45 and the attached surface portions 50c and 50c are then attached to the second shell 4 by screw fastening or the like. In a state where the bridge member 50 is attached to the second shell 4, as shown in FIGS. 11 and 12, both right and left end portions of the spanning portion 50a are respectively disposed on the stepped surfaces 45d and 45d of the inner wall portions 45 and 45 and the upper surface of the spanning portion 50a and the upper surfaces other than the stepped surfaces 45d and 45d of the inner wall portions 45 and 45 are located on the same plane.

As described above, the second shell 4 has the thin-walled portion 42a at the central portion in the right-and-left direction of the basal plane portion 42 and the bridge member 50 is mounted between the side face portions 43 and 43.

In this manner, by providing the thin-walled portion 42a at the central portion in the right-and-left direction of the basal plane portion 42, high strength is secured in the portions other than the thin-walled portion 42a of the basal plane portion 42, so that it is difficult for deformation to occur, and although stress easily concentrates on the thin-walled portion 42a, since the side face portions 43 and 43 are connected to each other by the bridge member 50, high strength of the second shell 4 as a whole can be secured.

Also, since the side face portions 43 and 43 are connected to each other by the bridge member 50, the distance between the side face portions 43 and 43 is maintained constant, so that positional precision of the holding grooves 45e, 45e, ... formed in the side face portions 43 and 43 is improved. Accordingly, positional precision of the disc-shaped recording media 100, 100, ... which are held in the holding grooves 45e, 45e, ... is improved, so that excellent holding states of the disc-shaped recording media 100, 100, ... can be secured.

Further, the second shell 4 is formed from a resin material and the bridge member 50 is formed from a metal material. Accordingly, improvement in formability of the second shell 4 can be attained and further improvement in the strength of the second shell 4 as a whole and further improvement in the positional precision of the side face portions 43 and 43 can also be attained.

Furthermore, the bridge member 50 is provided with the spanning portion 50a and the pair of bent portions 50b and 50b which protrude in the same orthogonal direction from both right and left end portions of the spanning portion 50a. Accordingly, improvement in the strength of the bridge member 50 is attained and further improvement in the strength of the second shell 4 as a whole and further improvement in the positional precision of the side face portions 43 and 43 can be attained.

In addition, since the bridge member 50 is mounted such that the upper surface of the spanning portion 50a of the bridge member 50 and the upper surfaces of the side face portions 43 and 43 are located on the same plane, the side face portions 43 and 43 are respectively pressed against both right and left end surfaces of the spanning portion 50a from the inside (refer to FIG. 12). Accordingly, further improvement in the positional precision of the side face portions 43 and 43 can be attained.

Also, since the bridge member 50 is mounted such that the upper surface of the spanning portion 50a of the bridge member 50 and the upper surfaces of the side face portions 43 and 43 are located on the same plane, a reduction in thickness in the up-and-down direction of the disc cartridge 1 can be attained.

Figure 13:
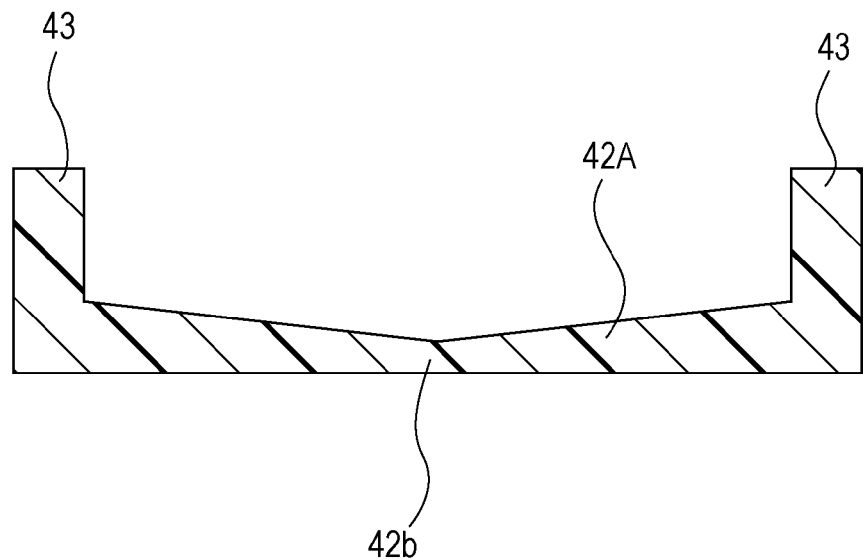
FIG. 13 is a cross-sectional view of the second shell illustrating the configuration of another thin-walled portion.
Figure 14:
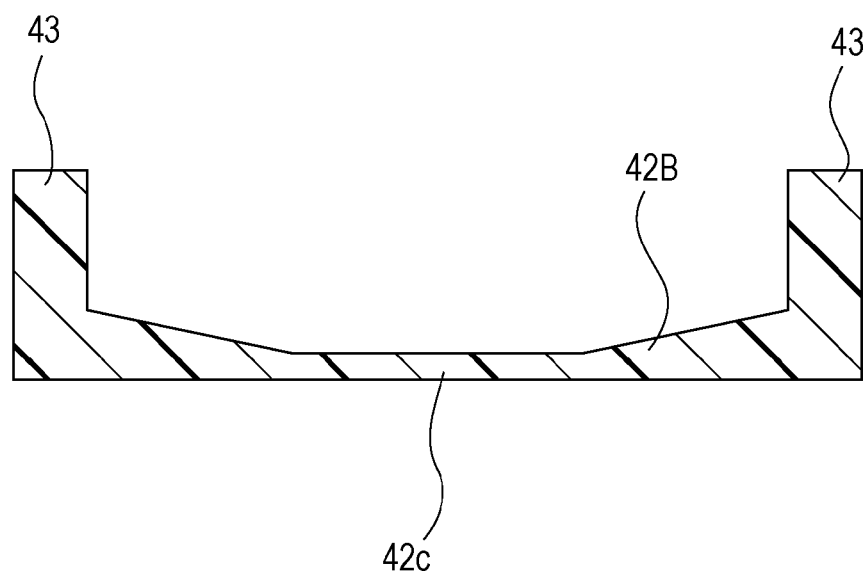
FIG. 14 is a cross-sectional view of the second shell illustrating the configuration of still another thin-walled portion.

In the above, an example is illustrated in which the thin-walled portion 42a is provided by forming a stepped portion at the central portion in the right-and-left direction of the basal plane portion 42. However, the thin-walled portion is not limited to such a shape. For example, as shown in FIG. 13, a thin-walled portion 42b may be formed by gradually thinning a thickness as it goes to the center of a basal plane portion 42A. Also, as shown in FIG. 14, a thin-walled portion 42c may be formed by gradually thinning the thickness of both right and left side portions of a basal plane portion 42B as it goes to the center and making the thickness of the central portion constant.

In the disc cartridge 1 configured as described above, the disc-shaped recording media 100, 100, ... are retained in the inside of the case body 2 (refer to FIG. 2). The disc-shaped recording medium 100 is retained in the inside of the case body 2 by inserting the outer circumferential portion from the front into the holding grooves 45e and 45e formed in the side face portions 43 and 43 of the second shell 4 in a state where the first shell 3 and the second shell 4 are separated from each other. Accordingly, an opening which is located at the front end of the second shell 4 is formed as a disc insertion/ejection opening 4a in which insertion and ejection of the disc-shaped recording media 100, 100, ... with respect to the second shell 4 are performed.

In a state where the first shell 3 and the second shell 4 are combined with each other and the opening and closing panel 37 is attached to the first shell 3, whereby the case body 2 is constituted, insertion grooves 2a and 2a extending back and forth are respectively formed between the lower surfaces of the side face portion 8 and 8 in the first shell 3 and the upper surfaces of the outer wall portions 44 and 44 in the second shell 4 (refer to FIG. 1). The insertion grooves 2a and 2a are respectively continuous at the rear ends thereof to the slider support portions 3a and 3a of the first shell 3 and continuous at the front ends thereof to the notches for insertion 38b and 38b formed in the panel portion 38 of the opening and closing panel 37.

In a state where the case body 2 is configured as described above, a state is created where the outer surfaces of the ribs 46a, 46a, ... provided at the inner wall portions 45 and 45 of the second shell 4 respectively come into contact with the inner surfaces of the side face portions 8 and 8 of the first shell 3. Accordingly, the inner wall portions 45 and 45 and the side face portions 8 and 8 do not come into surface-contact with each other, so that when a load is imparted from the side to the first shell 3, the load that is transmitted to the inner wall portions 45 and 45 is reduced, whereby improvement in resistance to impact can be attained.

Combining Operation and Separating Operation of Disc Cartridge

Hereinafter, a combining operation and a separating operation of the disc cartridge 1 will be described (refer to FIGS. 15 to 27).

Figure 15:
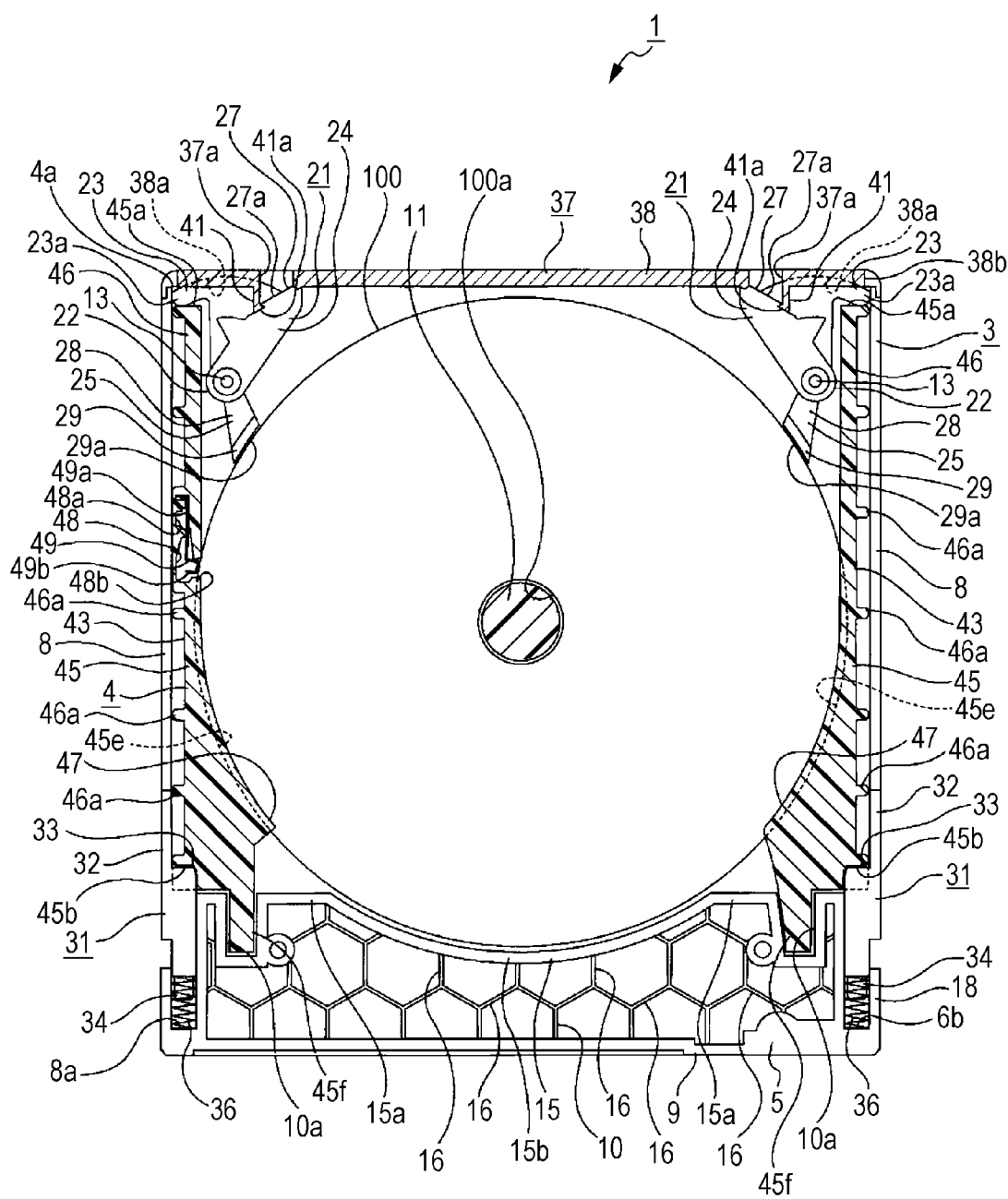
FIG. 15 is an enlarged cross-sectional view illustrating a state where the disc-shaped recording medium is positioned and retained at a regular position.
Figure 16:
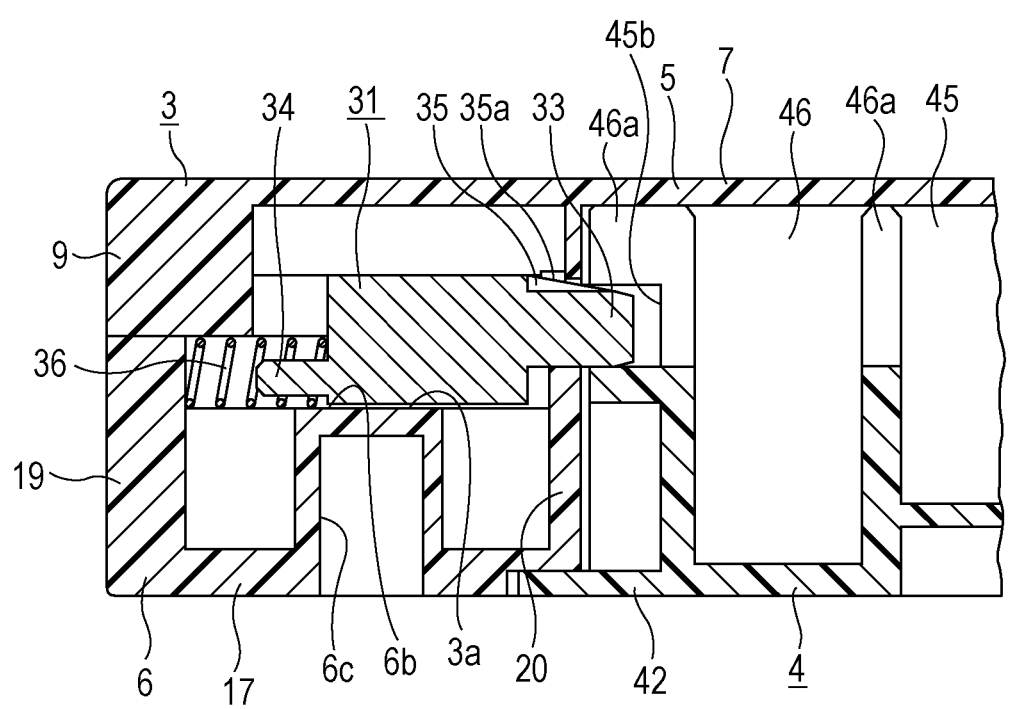
FIG. 16 is an enlarged cross-sectional view illustrating a state where the first shell and the second shell are locked by the locking slider.

First, with regard to a state where the first shell 3 and the second shell 4 have been combined with each other, a description is performed (refer to FIGS. 15 and 16).

The first shell 3 and the second shell 4 are combined with each other in a state where the base face portion 7 of the base body 5 and the basal plane portion 42 face each other up and down.

In a state where the first shell 3 and the second shell 4 have been combined with each other, the first shell 3 and the second shell 4 have been locked by the locking levers 21 and 21 and the locking sliders 31 and 31.

The locking levers 21 and 21 are located at turning ends in a direction (outward) in which the leading end portions of the locking portions 23 and 23 are separated from each other by the biasing forces of the biasing springs 30 and 30 (refer to FIG. 15) and the locking portions 23 and 23 are inserted into and engaged with the first concave portions for locking 45a and 45a respectively formed in the side face portion 43 and 43 of the second shell 4. At this time, the first concave portions for locking 45a and 45a are blocked by the locking portions 23 and 23 without gaps.

The locking sliders 31 and 31 are located at front movement ends by the biasing forces of the coil springs 36 and 36 (refer to FIGS. 15 and 16) and the locking portions 33 and 33 are inserted into and engaged with the second concave portions for locking 45b and 45b formed in the side face portions 43 and 43 of the second shell 4.

In a state where the first shell 3 and the second shell 4 are combined and locked as described above and the disc-shaped recording media 100, 100, . . . are retained in the inside of the case body 2, the spring portions 49b, 49b, . . . of the hold-down spring 49 respectively come into contact with and press portions of the outer circumferential surfaces of the disc-shaped recording media 100, 100, . . . (refer to FIG. 15). At this time, the other portions in the outer circumferential surfaces of the disc-shaped recording media 100, 100, . . . are pressed against portions respectively formed in the circular arc surface portions 47 and 47 of the side face portions 43 and 43, among the holding grooves 45e, 45e, . . . , so that the disc-shaped recording media 100, 100, . . . are positioned at regular positions in the inside of the case body 2.

In a state where the disc-shaped recording media 100, 100, . . . are positioned at regular positions, the regulation portion 15b of the outer wall 15 provided at the reinforcing section 10 of the first shell 3 or the regulation portion 20b of the front plate 20 provided at the auxiliary base 6 is located close to the portion on the rear end side of the outer circumferential surface of the disc-shaped recording medium 100. Also, the regulation surfaces 29a and 29a respectively formed at the balance portions 25 and 25 of the locking levers 21 and 21 are located close to the portion toward the front end of the outer circumferential surface of the disc-shaped recording medium 100.

Accordingly, even in a case where vibrations or an impact are imparted to the disc cartridge 1, so that the disc-shaped recording media 100, 100, . . . are displaced from the positioned positions, a state is maintained where the positions of the disc-shaped recording media 100, 100, . . . are regulated and positioned by the regulation portion 15b, the regulation portion 20b, or the regulation surfaces 29a and 29a.

Also, in a state where the first shell 3 and the second shell 4 are combined with each other, the unlocking portions 24 and 24 of the locking levers 21 and 21 are respectively pressed against the inclined surfaces 41a and 41a of the insertion portions 41 and 41 of the opening and closing panel 37 from the rear by the biasing forces of the biasing springs 30 and 30. At this time, the protrusions for insertion 27 and 27 are respectively inserted into the insertion holes 37a and 37a of the opening and closing panel 37 from the rear.

In this manner, in the disc cartridge 1, since the protrusions for insertion 27 and 27 of the locking levers 21 and 21 are respectively inserted into the insertion holes 37a and 37a of the opening and closing panel 37, it is difficult for dust or moisture to infiltrate into the inside of the case body 2 from the outside, the hermetic sealing performance of the case body 2 is high, and an excellent state of preservation of data recorded on the disc-shaped recording media 100, 100, . . . can be secured.

Also, since each of the right and left side surfaces 27b and 27b of the protrusions for insertion 27 and 27 is formed into a circular arc shape centered on the central axis of each of the supported portions 22 and 22, during turning of the locking levers 21 and 21, smooth insertion and drawing-out operations of the protrusions for insertion 27 and 27 with respect to the insertion holes 37a and 37a can be performed. Further, since each of the side surfaces 27b and 27b is formed into a circular arc shape centered on the central axis of each of the supported portions 22 and 22, in a state where the protrusions for insertion 27 and 27 are respectively inserted into the insertion holes 37a and 37a, excellent hermetic sealing performance of the case body 2 can be secured regardless of the turning positions of the locking levers 21 and 21.

Figure 17:
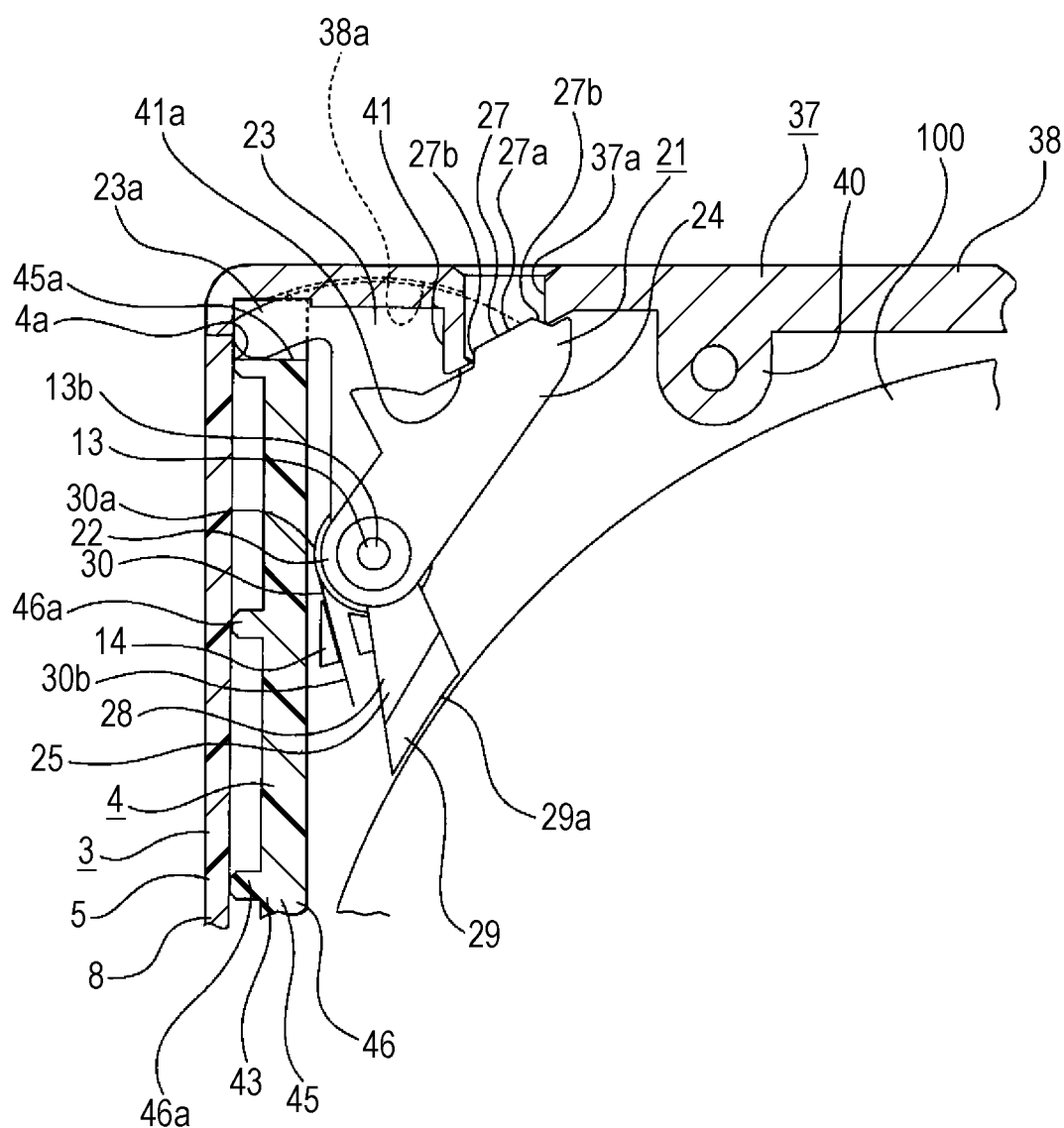
FIG. 17 is an enlarged cross-sectional view illustrating a state where a tapered protrusion for insertion is inserted into an insertion hole of an opening and closing panel.

Also, each of the protrusions for insertion 27 and 27 may be formed into a tapered shape in which an outer shape becomes smaller as it goes to a leading end, as shown in FIG. 17. By forming each of the protrusions for insertion 27 and 27 into a tapered shape, the outer circumferential surface of each of the protrusions for insertion 27 and 27 easily comes into close contact with the rear-side opening edge of each of the insertion holes 37a and 37a, so that further improvement in hermetic sealing performance in the inside of the case body 2 can be attained.

Further, in the disc cartridge 1, in a state where the first shell 3 and the second shell 4 are combined with each other, the protrusions for locking 23a and 23a of the locking portions 23 and 23 of the locking levers 21 and 21 are respectively inserted into the first concave portions for locking 45a and 45a formed in the side face portions 43 and 43 of the second shell 4, so that the first concave portions for locking 45a and 45a are blocked by the protrusions for locking 23a and 23a.

Accordingly, further improvement in hermetic sealing performance in the inside of the case body 2 can be attained.

In addition, since each of the protrusions for locking 23a and 23a of the locking portions 23 and 23 is formed into a tapered shape, each of the protrusions for locking 23a and 23a easily comes into close contact with the opening edge of each of the first concave portions for locking 45a and 45a, so that further improvement in hermetic sealing performance in the inside of the case body 2 can be attained.

Also, it is preferable to make each of the locking levers 21 and 21 be capable of moving in the axial direction of each of the support shafts 13 and 13 and form inclined surfaces as guide surfaces on both upper and lower surfaces which form the concave portions for insertion 38a and 38a of the opening and closing panel 37. Through such a configuration, improvement in insertability of the locking levers 21 and 21 with respect to the concave portions for insertion 38a and 38a can be attained.

In a state where the first shell 3 and the second shell 4 are combined with each other, the center pin 11 provided at the first shell 3 is inserted into central holes 100a, 100a, . . . of the disc-shaped recording media 100, 100, . . . . At this time, the inner surface of the panel portion 38 of the opening and closing panel 37 is located close to the front ends of the disc-shaped recording media 100, 100, . . . .

Figure 18:
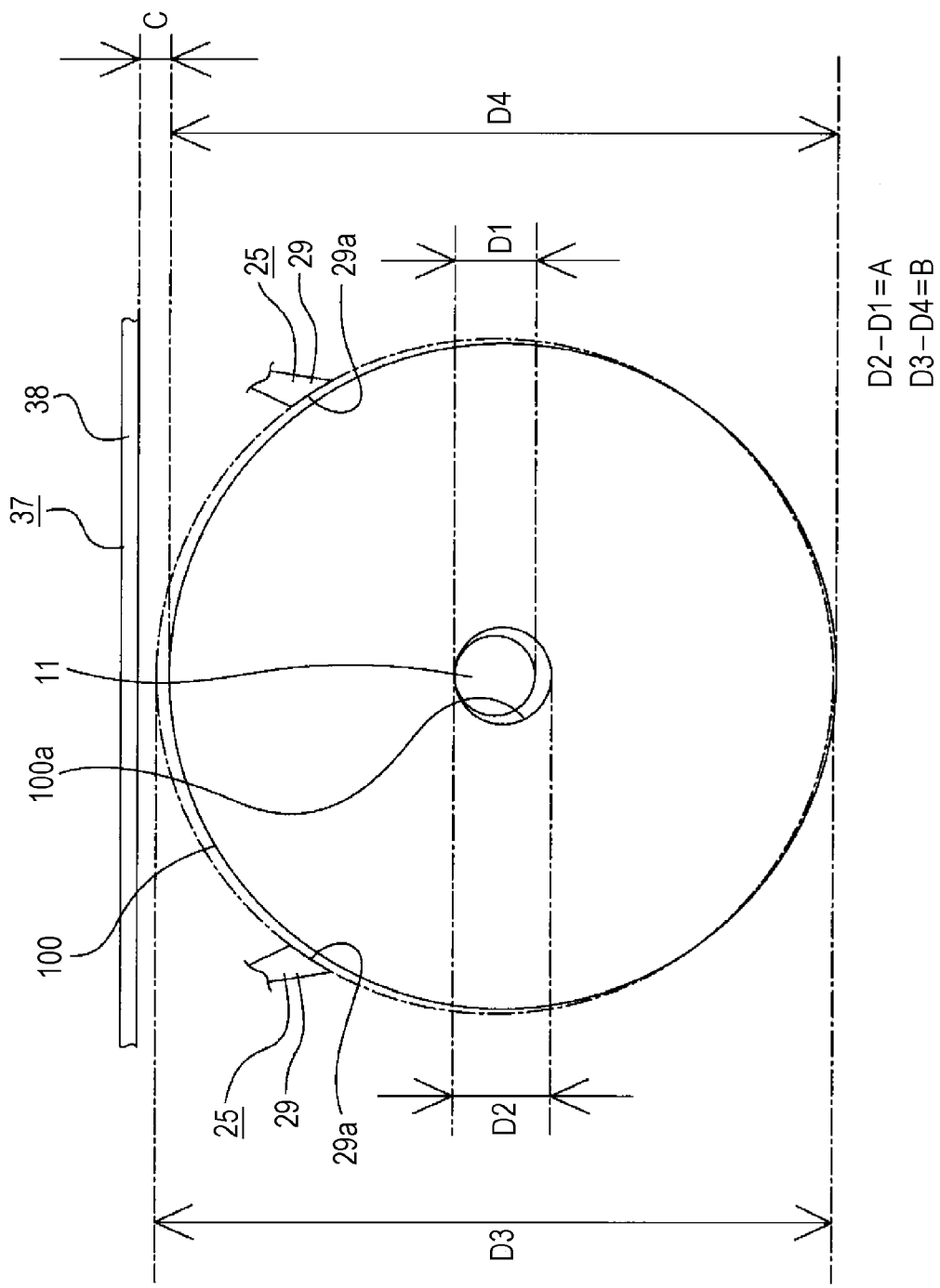
FIG. 18 is a schematic diagram for illustrating the dimension relationship between the respective portions.

In the disc cartridge 1, a dimension relationship as described below is set (refer to FIG. 18). Also, FIG. 18 is a conceptual diagram illustrating a state when the disc-shaped recording medium 100 has been pressed backward against the center pin 11, in order to facilitate the following description.

A difference between a diameter D1 of the center pin 11 and a diameter D2 of the central hole 100a of the disc-shaped recording medium 100 is set to be A, a difference between a diameter D3 of a circle which is formed extending the regulation surfaces 29a and 29a respectively provided at the protrusions for regulation 29 and 29 of the locking levers 21 and 21 and a diameter D4 of the disc-shaped recording medium 100 is set to be B, and a difference between the outer circumferential surface of the disc-shaped recording medium 100 and the inner surface of the opening and closing panel 37 when the disc-shaped recording medium 100 has been pressed backward against the center pin 11 is set to be C.

At this time, in the disc cartridge 1, a dimension relationship of C>A>B is set.

Accordingly, in a case where position deviation occurs with respect to a state where the disc-shaped recording medium 100 is positioned at a regular position (refer to FIG. 15), the outer circumferential surface of the disc-shaped recording medium 100 comes into contact with the regulation surfaces 29a and 29a of the protrusions for regulation 29 and 29 in accordance with B which is the smallest difference in distance, so that a position is regulated.

Also, even in a case where a great impact or the like is imparted to the disc cartridge 1, such that great position deviation or deformation or the like of the disc cartridge 1 or the disc-shaped recording medium 100 occurs, the inner circumferential surface of the disc-shaped recording medium 100 comes into contact with the center pin 11 in accordance with A, in which the difference in distance is smaller than C, so that the position of the disc-shaped recording medium 100 is regulated.

In this manner, in a case where position deviation of the disc-shaped recording medium 100 occurs, the position of the disc-shaped recording medium 100 is regulated by the regulation surfaces 29a and 29a or the position of the disc-shaped recording medium 100 is regulated by the center pin 11, so that the outer circumferential surface of the disc-shaped recording medium 100 does not come into contact with the inner surface of the panel portion 38 of the opening and closing panel 37.

Accordingly, when the first shell 3 is moved upward with respect to the second shell 4, so that the first shell 3 and the second shell 4 are separated from each other, the panel portion 38 does not come into sliding-contact with the outer circumferential surface of the disc-shaped recording medium 100, so that generation of damage or breakage of the disc-shaped recording medium 100 can be prevented.

Also, in the disc cartridge 1, in addition to the supported portion 22, the locking portion 23, and the unlocking portion 24, the balance portion 25 is provided at the locking lever 21 which locks the first shell 3 and the second shell 4, and by providing the balance portion 25, the center of gravity of the locking lever 21 is made to be located at the center of the supported portion 22 or in the vicinity thereof.

Accordingly, when a great impact has been imparted to the case body 2, for example, when the disc cartridge 1 has dropped accidentally, it is difficult for the locking levers 21 and 21 to be turned by the impact, so that unlocking in the combined state is prevented. Even when a great impact has been imparted in this manner, since unintended unlocking is prevented, damage to the disc-shaped recording medium 100 stored in the inside or jumping of the disc-shaped recording medium 100 out of the case body 2 does not occur, so that it is possible to excellently preserve data recorded on the disc-shaped recording medium 100.

Also, since the center of gravity of the locking lever 21 is located at the center of the supported portion 22 or in the vicinity thereof, it is possible to reduce the load on the biasing springs 30 and 30. Also, the load on the biasing springs 30 and 30 is similarly reduced even in a case where the case body 2 is made to be long in the vertical direction and the disc-shaped recording media 100, 100, . . . are preserved in a direction facing in the horizontal direction.

Further, since the regulation surfaces 29a and 29a which regulate the position of the disc-shaped recording medium 100 are respectively formed at the balance portions 25 and 25 of the locking levers 21 and 21, it is possible to prevent position deviation of the disc-shaped recording medium 100 and also attain a reduction in the number of components.

Furthermore, since the regulation surfaces 29a and 29a of the balance portions 25 and 25 are formed into a circular arc plane shape which follows the outer circumferential surface of the disc-shaped recording medium 100, it is possible to attain improvement in positioning precision of the disc-shaped recording medium 100.

In addition, in the disc cartridge 1, the center pin 11 which is inserted into the central holes 100a, 100a, . . . of the disc-shaped recording media 100, 100, . . . , thereby regulating the positions of the disc-shaped recording media 100, 100, . . . , is provided at the case body 2. Accordingly, when the first shell 3 and the second shell 4 are combined with each other, the positions of the disc-shaped recording media 100, 100, . . . are regulated at the same time, so that it is possible to simply and reliably perform position regulation of the disc-shaped recording medium 100.

In a state where the first shell 3 and the second shell 4 are combined and locked as described above, portions of the locking portions 23 and 23 of the locking levers 21 and 21 are respectively inserted into the concave portions for insertion 38a and 38a formed in the panel portion 38 of the opening and closing panel 37 (refer to FIGS. 15 and 17). Accordingly, when a great impact has been imparted to the case body 2, for example, when the disc cartridge 1 has accidentally dropped, since movement of the locking portions 23 and 23 is regulated to the concave portions for insertion 38a and 38a, it is difficult for a fall to occur in the locking levers 21 and 21 and breakage of the support shafts 13 and 13 is prevented, so that damage to the disc-shaped recording medium 100 or jumping of the disc-shaped recording medium 100 out of case body 2 does not occur, whereby it is possible to excellently preserve data recorded on the disc-shaped recording medium 100.

Also, since each of the locking levers 21 and 21 is located on the front side by an amount corresponding to each of the concave portions for insertion 38a and 38a formed in the panel portion 38, it is possible to reduce the widths in the front-and-back direction of the first concave portions for locking 45a and 45a respectively formed in the side face portions 43 and 43 of the second shell 4. Accordingly, it is possible to prevent the disc-shaped recording medium 100 dropping out during insertion and during ejection of the disc-shaped recording medium 100 with respect to the disc insertion/ejection opening 4a of the second shell 4.

Furthermore, in the biasing springs 30 and 30, the coil portions 30a and 30a are respectively supported on the spring support portions 13a and 13a provided at the base face portion 7 sides of the support shafts 13 and 13, the arm portions 30b and 30b on one side are respectively supported on the spring hooking protrusions 14 and 14 provided at the base face portion 7, and the arm portions 30c and 30c on the other side are respectively supported on the spring support protrusions 23b and 23b of the locking levers 21 and 21, which protrude to the base face portion 7 sides.

Accordingly, all portions of the biasing springs 30 and 30 are disposed along the base face portion 7, so that a reduction in size by effective utilization of a space of the inside of the case body 2 can be attained.

Further, in the disc cartridge 1, in a state where the locking levers 21 and 21 are respectively supported on the support shafts 13 and 13, the attached protrusions 39 and 39 of the opening and closing panel 37 are respectively attached to the support shafts 13 and 13.

Accordingly, the support shafts 13 and 13 can be prevented from falling by the attached portions 39 and 39.

In addition, in the disc cartridge 1, the attached protrusions 39 and 39 respectively attached to the support shafts 13 and 13 are located facing the locking levers 21 and 21 and close thereto.

Accordingly, it is possible to prevent the locking levers 21 and 21 and the biasing springs 30 and 30 dropping out from the support shafts 13 and 13 and also to regulate movement of the locking levers 21 and 21 in the axial directions of the support shafts 13 and 13, thereby attaining proper turning operations of the locking levers 21 and 21.

In a state where the first shell 3 and the second shell 4 are combined as described above, for example, the disc cartridge 1 is inserted from the cartridge insertion/ejection opening (not shown) of the disc changer and then held on an unlocking mechanism 70 provided at the disc changer.

Figure 19:
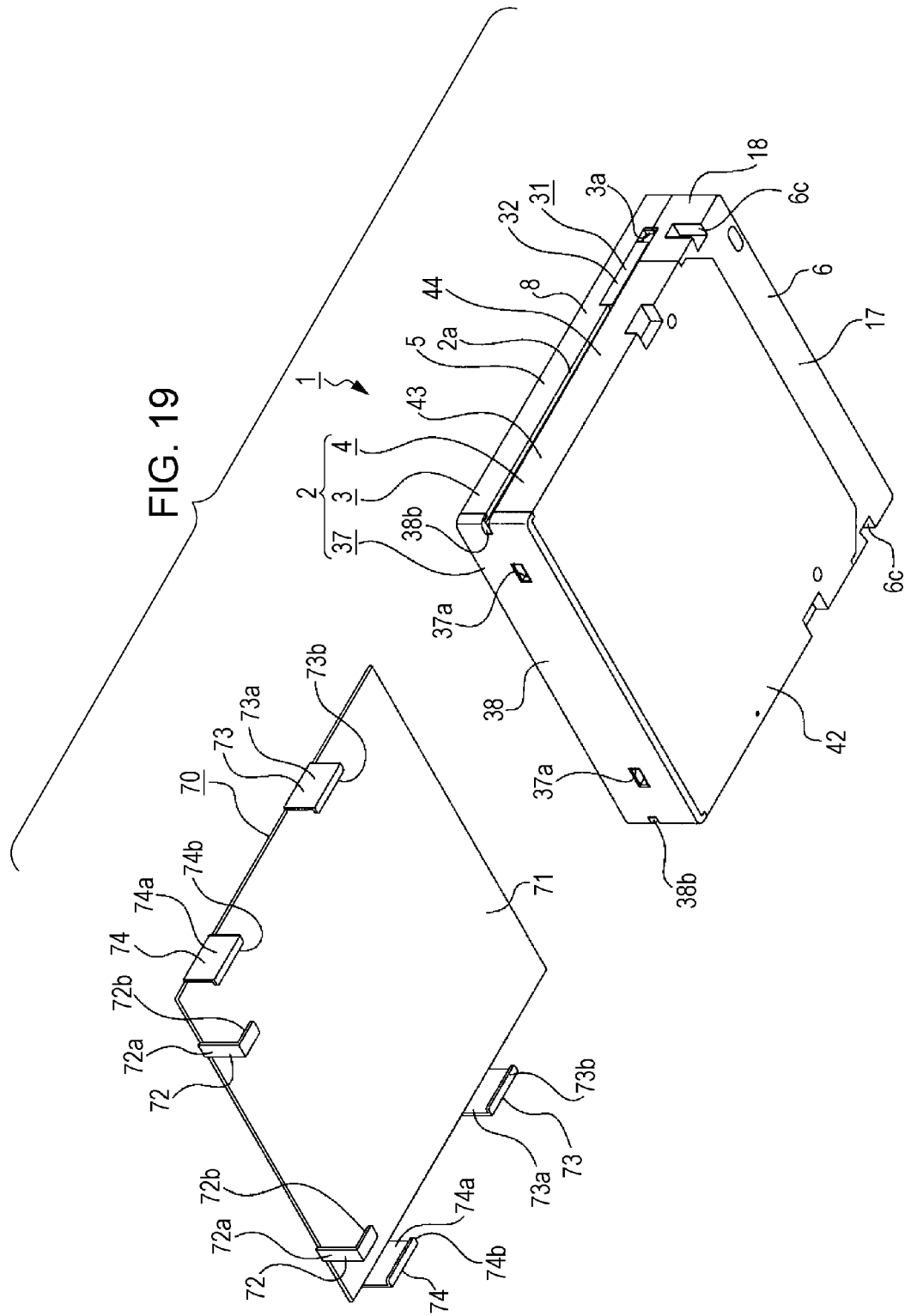
FIG. 19 is a perspective view illustrating the disc cartridge and an unlocking mechanism.

For example, the respective portions are provided at a rectangular plate-like holding base 71 facing the up-and-down direction, as shown in FIG. 19, whereby the unlocking mechanism 70 is constituted.

At the front edge of the holding base 71, pressing pieces for release 72 and 72 which protrude downward and is located being spaced from each other right and left are provided. The pressing piece for release 72 has a connection portion 72a which is continuous to the holding base 71 and faces in the front-and-back direction, and a pressing portion 72b which protrudes backward from the lower edge of the connection portion 72a.

At the position toward the rear end in both right and left edges of the holding base 71, unlocking pieces 73 and 73 which protrude downward are respectively provided. The unlocking piece 73 has a connection portion 73a which is continuous to the holding base 71 and faces in the right-and-left direction, and a release portion 73b which protrudes inward from the lower edge of the connection portion 73a.

At the position toward the front end in both right and left edges of the holding base 71, auxiliary pieces 74 and 74 which protrude downward are respectively provided. The auxiliary piece 74 has a connection portion 74a which is continuous to the holding base 71 and faces in the right-and-left direction, and an insertion portion 74b which protrudes inward from the lower edge of the connection portion 74a.

Figure 20:
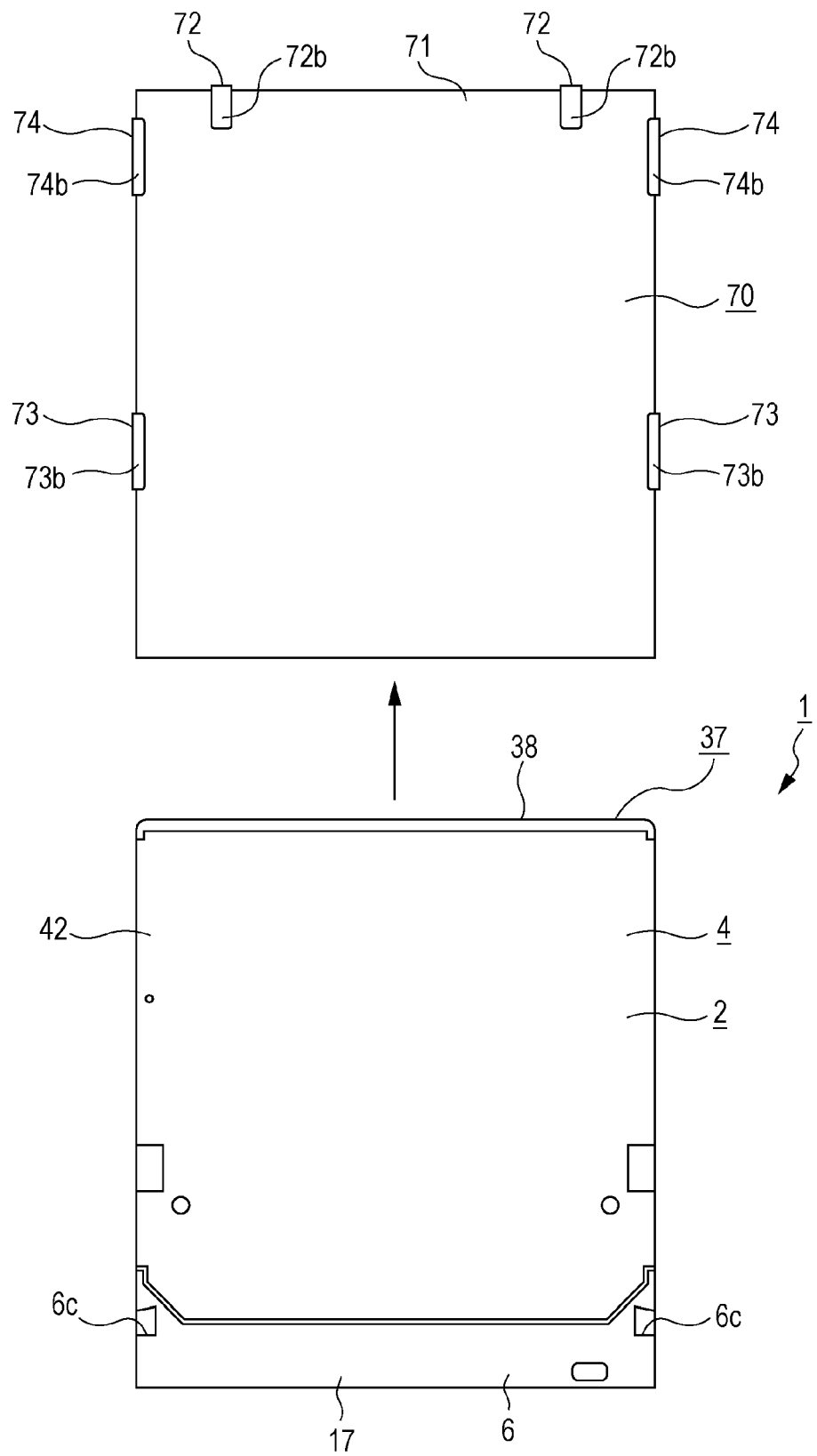
FIG. 20 is a bottom view illustrating the disc cartridge and the unlocking mechanism.

If the disc cartridge 1 is inserted and advances from the cartridge insertion/ejection opening of the disc changer, as shown in FIG. 20, the release portions 73b and 73b of the unlocking pieces 73 and 73 and the insertion portions 74b and 74b of the auxiliary pieces 74 and 74 in the unlocking mechanism 70 are respectively inserted into and advance in the insertion grooves 2a and 2a.

Figure 21:
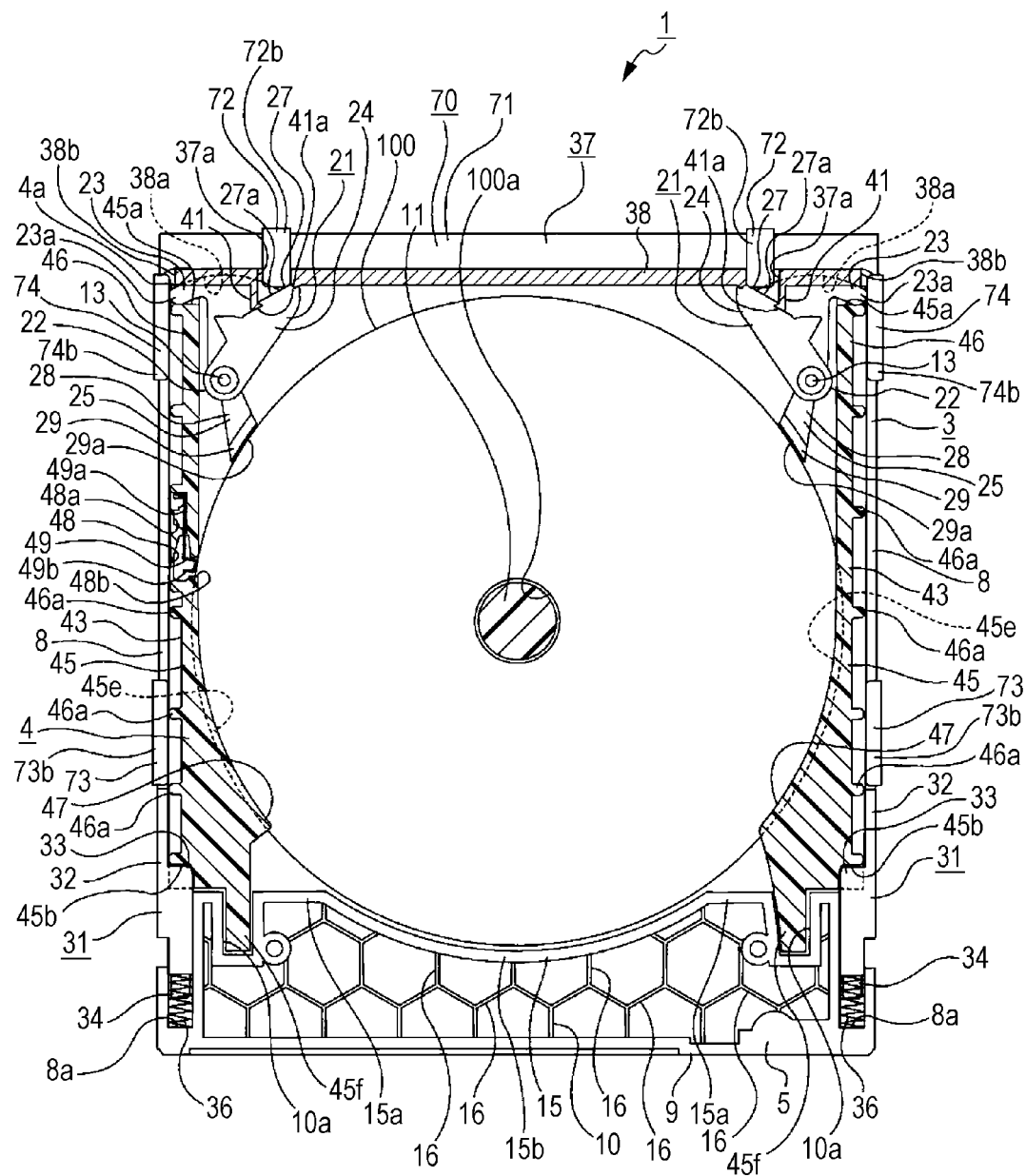
FIG. 21 is a cross-sectional view illustrating a state immediately before locking of the first shell and the second shell is released by the unlocking mechanism.
Figure 22:
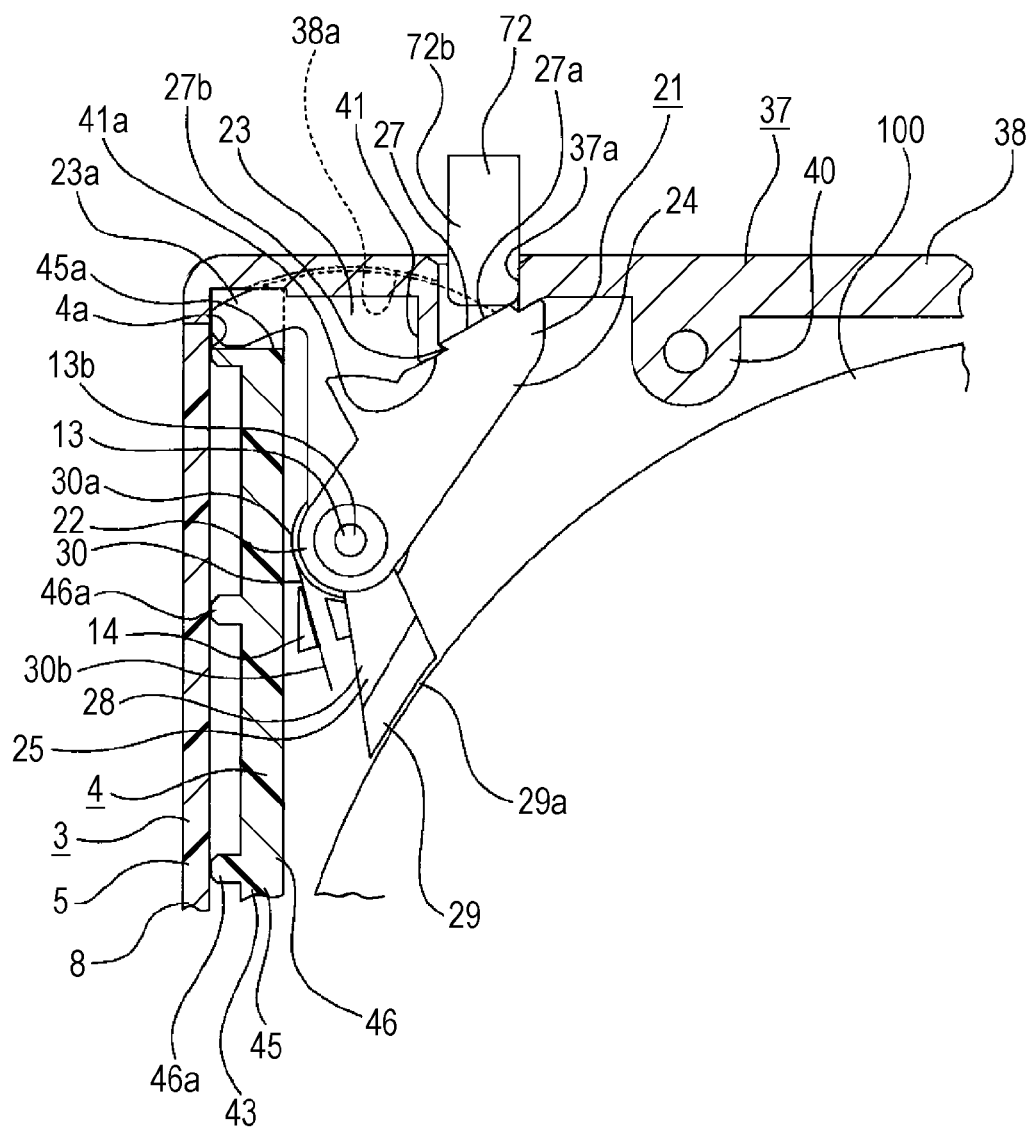
FIG. 22 is an enlarged cross-sectional view illustrating a state immediately before locking of the first shell and the second shell is released by the unlocking mechanism.

If the disc cartridge 1 is further inserted and advances from the cartridge insertion/ejection opening, the pressing portions 72b and 72b of the pressing pieces for release 72 and 72 in the unlocking mechanism 70 are respectively inserted into the insertion holes 37a and 37a of the opening and closing panel 37 (refer to FIGS. 21 and 22).

Figure 23:
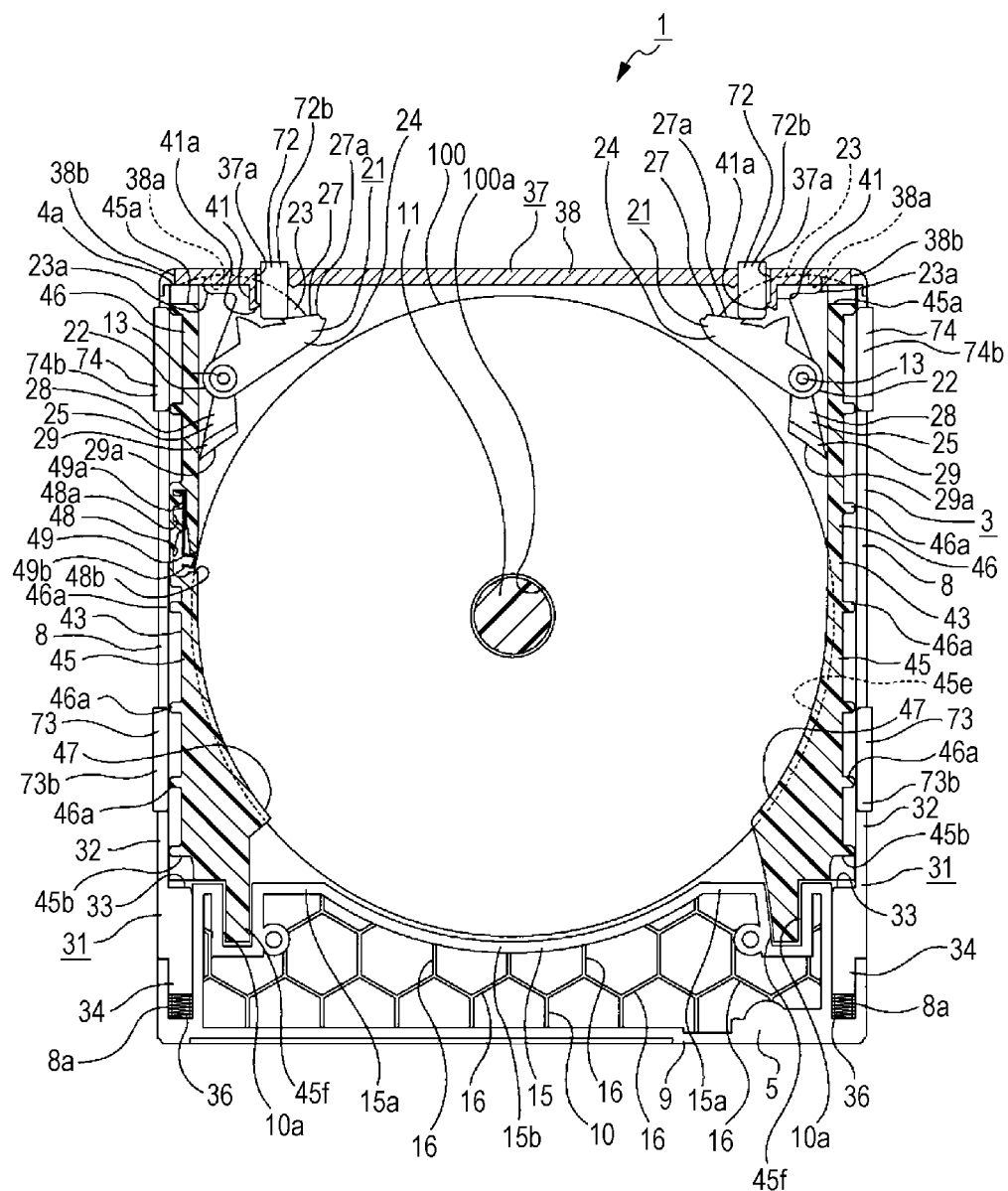
FIG. 23 is a cross-sectional view illustrating a state where locking of the first shell and the second shell has been released by the unlocking mechanism.
Figure 24:
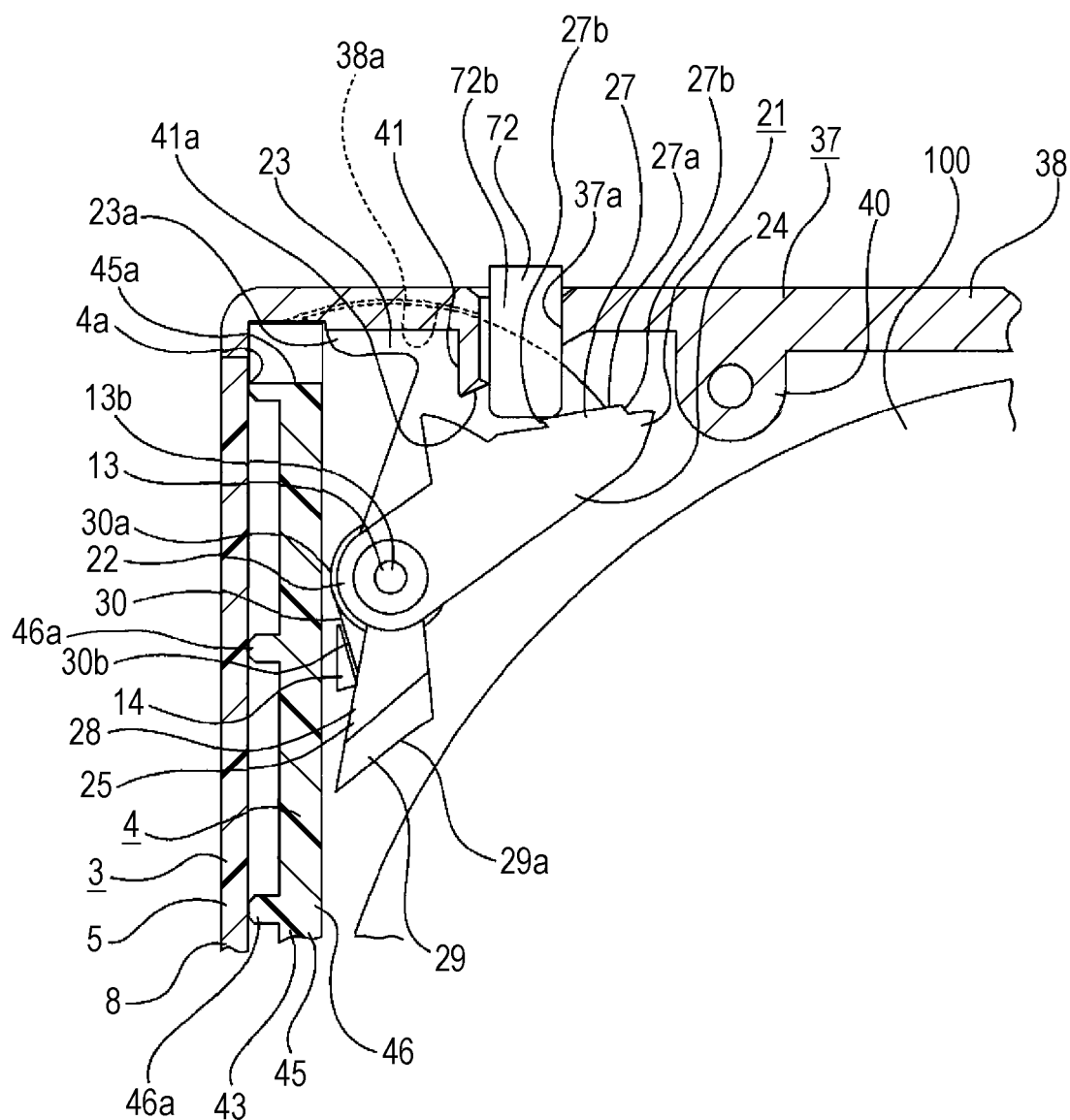
FIG. 24 is an enlarged cross-sectional view illustrating a state where locking of the first shell and the second shell has been released by the unlocking mechanism.

If the pressing portion 72b of the pressing piece for release 72 is inserted into the insertion hole 37a of the opening and closing panel 37, the protrusion for insertion 27 of the unlocking portion 24 of the locking lever 21 is pressed backward by the pressing portion 72b (refer to FIGS. 23 and 24). At this time, in the locking lever 21, since the inclined surface 27a inclined in the right-and-left direction with respect to the front-and-back direction is pressed by the pressing portion 72b, the locking lever 21 is turned while the inclined surface 27a is smoothly slid with respect to the pressing portion 72b, so that it is difficult for a load in the turning direction of the locking lever 21 to be imparted to the pressing piece for release 72.

The locking lever 21 is turned against the biasing force of the biasing spring 30 by the pressing portion 72b, so that the protrusion for locking 23a of the locking portion 23 is drawn out of the first concave portion for locking 45a of the second shell 4, whereby locking of the first shell 3 and the second shell 4 by the locking lever 21 is released. When locking of the first shell 3 and the second shell 4 by the locking lever 21 has been released, the regulation surface 29a of the balance portion 25 is moved to a position deviated from the outer circumferential surface of the disc-shaped recording medium 100, so that regulation of the disc-shaped recording medium 100 by the regulation surface 29a is released.

Figure 25:
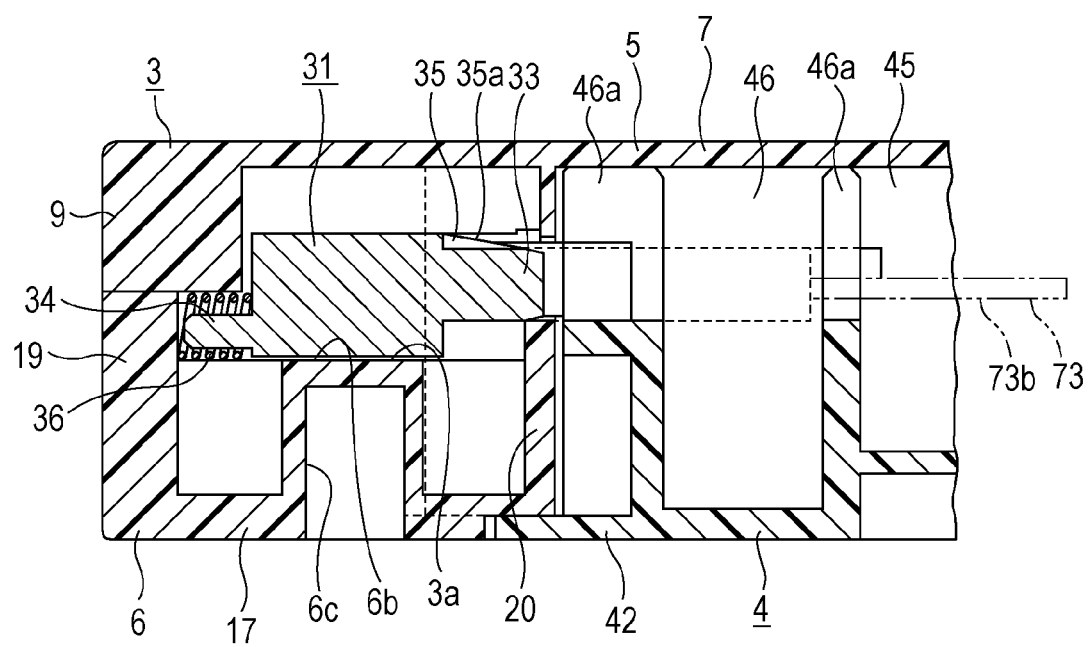
FIG. 25 is an enlarged cross-sectional view illustrating a state where locking by the locking slider has been released by the unlocking mechanism.
Figure 26:
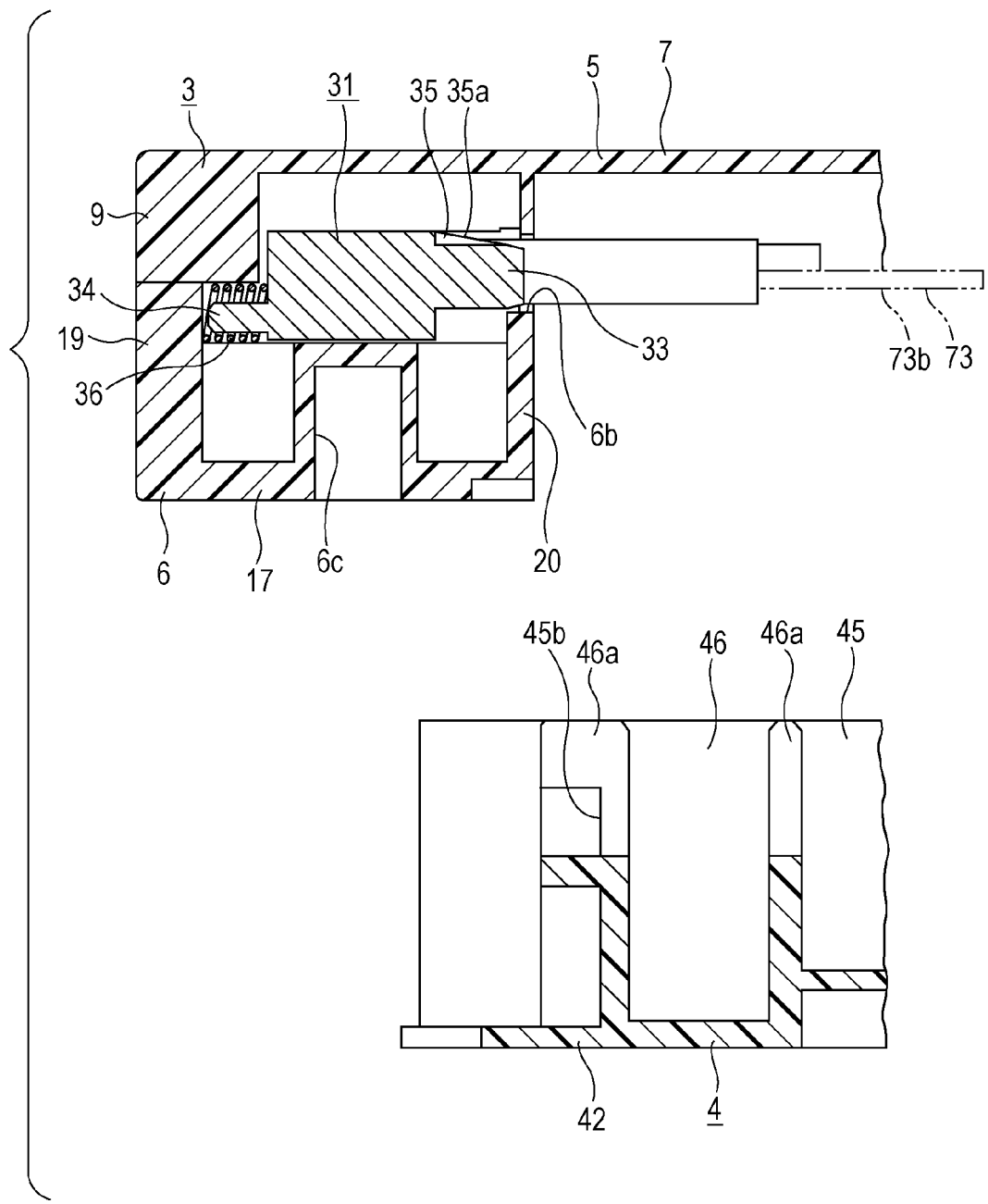
FIG. 26 is an enlarged cross-sectional view illustrating a state where locking by the locking slider has been released by the unlocking mechanism and the first shell and the second shell have been separated from each other.

Also, if the unlocking piece 73 is inserted into the insertion groove 2a, so that the supported portion 32 of the locking slider 31 is pressed by the release portion 73b, the locking slider 31 is moved backward against the biasing force of the biasing spring 36, so that the locking portion 33 is drawn out of the second concave portion for locking 45b of the second shell 4 (refer to FIG. 25). If the locking portion 33 is drawn out of the second concave portion for locking 45b, locking of the first shell 3 and the second shell 4 by the locking slider 31 is released. Release of locking of the first shell 3 and the second shell 4 by the locking slider 31 is performed simultaneously with release of locking of the first shell 3 and the second shell 4 by the locking lever 21.

If locking of the first shell 3 and the second shell 4 by the locking levers 21 and 21 and the locking sliders 31 and 31 is released, a state is created where the first shell 3 and the second shell 4 can be separated from each other in the up-and-down direction, and then, for example, the second shell 4 is moved downward by a movement mechanism (not shown) (refer to FIG. 26) and the disc-shaped recording medium 100 stored therein is ejected from the case body 2 by an ejection mechanism (not shown).

As described above, when the disc cartridge 1 has been inserted into the inside of the disc changer, the case body 2 is held at or moved to a predetermined position with the gripping portions 6c and 6c formed in the case body 2 gripped by a cartridge holding mechanism (not shown).

At this time, in the disc cartridge 1, the gripping portions 6c and 6c are formed in one of the first shell 3 and the second shell 4, which constitute the case body 2, for example, in the second shell 4, and the gripping portions 6c and 6c are formed at positions other than a projection plane in the axial direction of the disc-shaped recording media 100, 100, . . . stored in the case body 2.

In this manner, in the disc cartridge 1, the gripping portions 6c and 6c are present at positions which do not cover the first shell 3 and the second shell 4 and at positions other than a projection plane of the disc-shaped recording media 100, 100, . . . . Accordingly, high strength of the gripping portions 6c and 6c is secured and also it is difficult for a load to be imparted from the cartridge holding mechanism to the stored disc-shaped recording media 100, 100, . . . when the disc cartridge 1 is gripped by the cartridge holding mechanism, so that it is possible to excellently preserve data recorded on the disc-shaped recording media 100, 100, . . . .

Also, since the reinforcing section 10 and the auxiliary base 6 functioning as a reinforcing section are provided in the inside of the case body 2, it is possible to attain improvement in strength of the first shell 3, so that it is possible to prevent damage or breakage of the case body 2.

Further, since the reinforcing section 10 and the auxiliary base 6 are provided at portions where the gripping portions 6c and 6c are formed, strength of the gripping portions 6c and 6c becomes high, so that it is possible to more excellently preserve data recorded on the disc-shaped recording media 100, 100, . . . .

Furthermore, at the reinforcing section 10 and the auxiliary base 6, a plurality of partition walls 16, 16, . . . and 6d, 6d, . . . having a plurality of spaces are respectively provided.

Accordingly, improvement in strength of the case body 2 can be attained with a simple structure, and also since a plurality of spaces are provided, it is difficult for the case body 2 to be submerged, it is possible to lengthen the collection time when suspended in water, and it is also possible to reduce the influence of wind and rain when wind and rain or a natural disaster, such as a flooding, occurs or during transport. Also, by making the volume of a space in the inside of the disc cartridge 1 larger than the volume of water having the same weight as the weight of the disc cartridge 1, it is possible to secure sufficient buoyancy when the disc cartridge 1 has been dropped into water.

Also, since portions of the reinforcing section 10 and the auxiliary base 6 are provided as the regulation portions 15*b* and 20*b* which regulate the positions of the disc-shaped recording media 100, 100, . . . , it is possible to perform position regulation of the disc-shaped recording media 100, 100, . . . with a reduction in the number of components and in manufacturing costs attained.

In addition, since a pair of groove portions is formed as the gripping portions 6*c* and 6*c*, the structures of the gripping portions 6*c* and 6*c* are simple, so that a reduction in manufacturing costs can be attained, and also since the gripping portions 6*c* and 6*c* do not protrude outward, a reduction in size of the disc cartridge 1 can be attained.

As described above, in a state where the first shell 3 and the second shell 4 have been separated from each other, for example, by moving upward the second shell 4 so as to come close to the first shell 3, it is possible to combine the first shell 3 and the second shell 4.

When the first shell 3 and the second shell 4 are combined with each other, the locking levers 21 and 21 are held at the turned positions where locking has been released and the locking sliders 31 and 31 are held at the moved positions where locking has been released (refer to FIGS. 24 and 25).

If the second shell 4 is moved upward, thereby coming into contact with the first shell 3, and the two are then moved backward, pressing of the pressing portions 72*b* and 72*b* of the pressing pieces for release 72 and 72 against the protrusions for insertion 27 and 27 of the unlocking portions 24 and 24 is released, so that the locking levers 21 and 21 are respectively turned by the biasing forces of the biasing springs 30 and 30. Accordingly, the protrusions for locking 23*a* and 23*a* of the locking portions 23 and 23 are respectively inserted into and engaged with the first concave portion for locking 45*a* and 45*a* of the second shell 4, so that locking of the first shell 3 and the second shell 4 by the locking levers 21 and 21 is performed.

Figure 27:
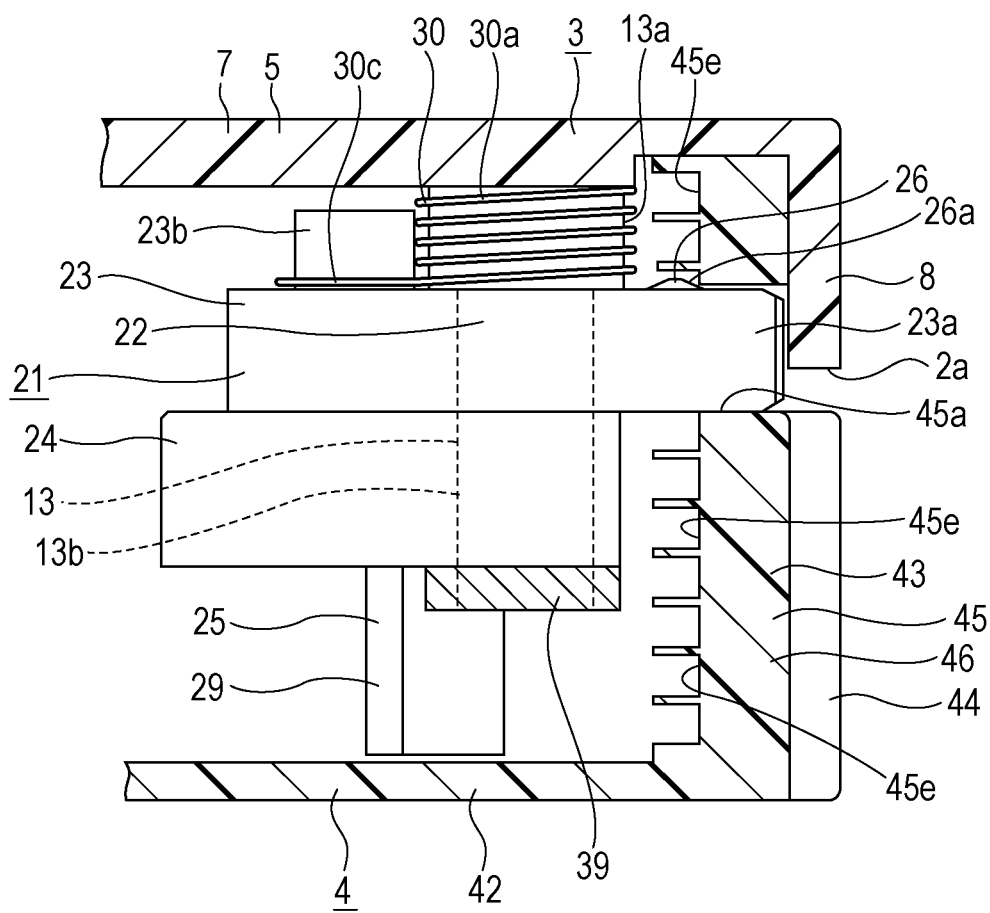
FIG. 27 is an enlarged cross-sectional view illustrating a state immediately before the locking lever is turned and the first shell and the second shell are combined with each other.

At this time, since in the locking lever 21, the convex portion 26 is provided at the locking portion 23, locking is performed while the sliding-contact surface 26*a* of the convex portion 26 comes into sliding-contact with the opening edge of the first concave portion for locking 45*a*, as shown in FIG. 27. Accordingly the second shell 4 is displaced in a direction in which it is moved upward and the first shell 3 is displaced in a direction in which it is moved downward, whereby the first shell 3 and the second shell 4 are displaced in a direction in which they come close to each other, thereby being combined with each other. In this manner, the convex portion 26 of the locking lever 21 functions as a displacement structure.

As described above, when the first shell 3 and the second shell 4 are combined with each other, since the first shell 3 and the second shell 4 are displaced in a direction, in which they come close to each other, due to the convex portion 26 functioning as a displacement structure, excellent hermetic sealing performance of the first shell 3 and the second shell 4 can be secured.

Also, when the second shell 4 is moved upward, thereby coming into contact with the first shell 3, and the two are then moved backward, pressing of the release portions 73*b* and 73*b* of the unlocking pieces 73 and 73 against the supported portions 32 and 32 is released, so that the locking sliders 31 and 31 are respectively moved forward by the biasing forces of the coil springs 36 and 36. Accordingly, the locking portions 33 and 33 are respectively inserted into and engaged with the second concave portion for locking 45*b* and 45*b* of the second shell 4, so that locking of the first shell 3 and the second shell 4 by the locking sliders 31 and 31 is performed.

Figure 28:
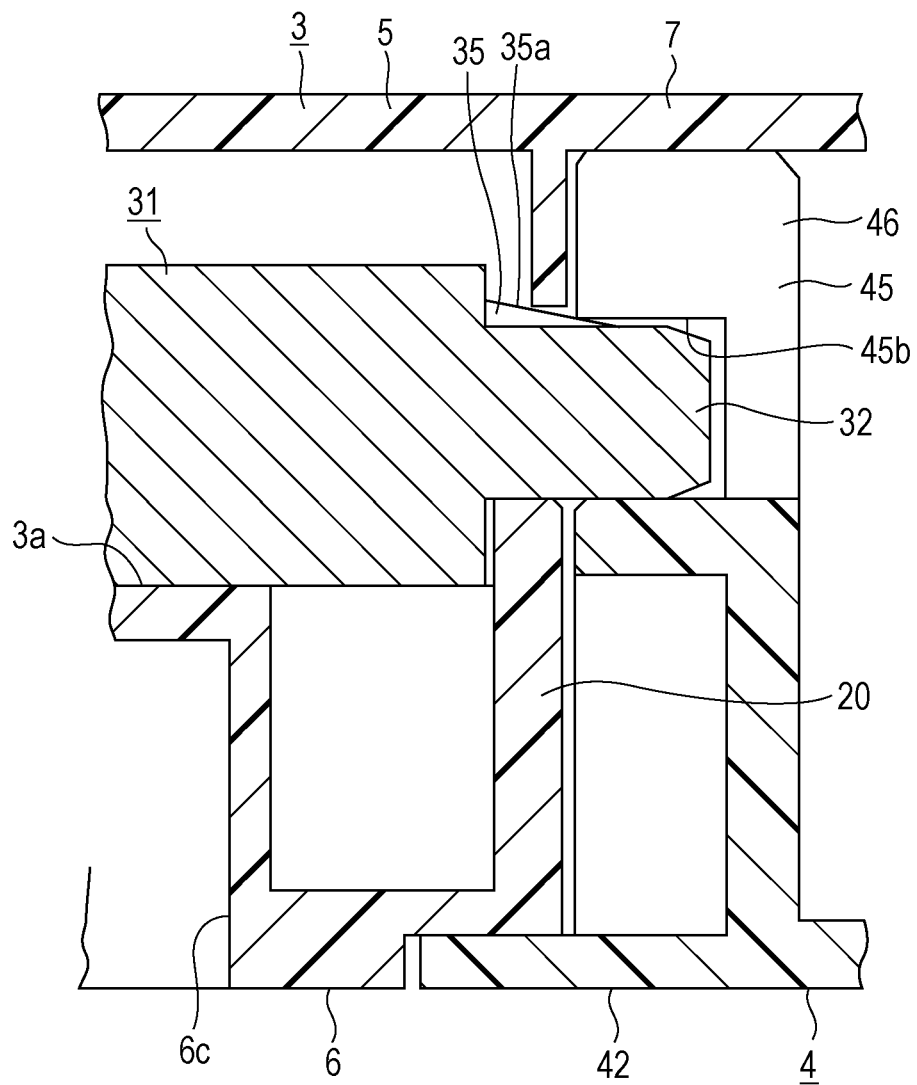
FIG. 28 is an enlarged cross-sectional view illustrating a state immediately before the locking slider is moved and the first shell and the second shell are combined with each other.

At this time, since in the locking slider 31, the convex portion 35 is provided at the locking portion 33, locking is performed while the sliding-contact surface 35*a* of the convex portion 35 comes into sliding-contact with the opening edge of the second concave portion for locking 45*b*, as shown in FIG. 28. Accordingly the second shell 4 is displaced in a direction in which it is moved upward and the first shell 3 is displaced in a direction in which it is moved downward, whereby the first shell 3 and the second shell 4 are displaced in a direction in which they come close to each other, thereby being combined with each other. In this manner, the convex portion 35 of the locking slider 31 functions as a displacement structure.

As described above, when the first shell 3 and the second shell 4 are combined with each other, since the first shell 3 and the second shell 4 are displaced in a direction, in which they come close to each other, due to the convex portion 35 functioning as a displacement structure, excellent hermetic sealing performance of the first shell 3 and the second shell 4 can be secured.

In a state where the first shell 3 and the second shell 4 have been combined with each other, the rear end portion of the second shell 4 is disposed in the concave portion 17*a* of the bottom plate 17 of the first shell 3, so that the hermetic sealing performance of the first shell 3 and the second shell 4 is secured.

Also, the insertion portions 45*f* and 45*f* of the inner wall portion 45 and 45 of the second shell 4 are respectively inserted into the insertion concave portions 3*b* and 3*b* formed at the positions toward the rear end of the first shell 3, so that positioning of the first shell 3 and the second shell 4 is performed.

As described above, in the disc cartridge 1, when the first shell 3 and the second shell 4 are combined with each other, the displacement structures are provided which press the first shell 3 against the second shell 4 and press the second shell 4 against the first shell 3.

Accordingly, excellent hermetic sealing performance is secured in the combined state of the first shell 3 and the second shell 4, so that it is difficult for dust or moisture to infiltrate from the outside into the inside of the case body 2, whereby it is possible to secure the excellent state of preservation of data recorded on the disc-shaped recording media 100, 100, . . . .

Further, it is also possible to prevent infiltration of foreign matter or moisture into the inside during transport of the disc cartridge 1 or the time of a natural disaster.

In the disc cartridge 1, as the above-mentioned displacement structures, the convex portions 26 and 26 of the locking levers 21 and 21 and the convex portions 35 and 35 of the locking sliders 31 and 31 are provided.

Accordingly, the displacement structures have a simple structure, so that it is possible to secure excellent hermetic sealing performance of the first shell 3 and the second shell 4 without causing rising of a manufacturing cost. Also, since the displacement structure are provided at the locking levers 21 and 21 and the locking sliders 31 and 31, it is possible to reliably secure excellent hermetic sealing performance during locking of the combined state of the first shell 3 and the second shell 4.

Also, in the above, as examples of the displacement structure, the convex portions 26 and 26 of the locking levers 21 and 21 and the convex portions 35 and 35 of the locking sliders 31 and 31 are illustrated. However, the displacement structure is not limited to these examples.

Figure 29:
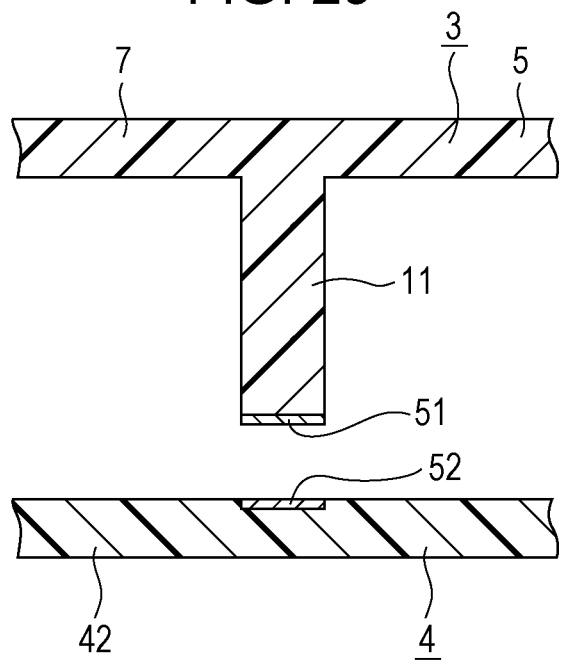
FIG. 29 is an enlarged cross-sectional view illustrating an example where a magnet is attached to one of a center pin and the second shell and a magnetic body or a magnet is attached to the other.

For example, as shown in FIG. 29, a configuration is also acceptable in which a magnet 51 is disposed at one of a leading end portion of the center pin 11 provided at the first shell 3 and the basal plane portion 42 of the second shell 4 and a magnetic member 52 or a magnet is disposed at the other. Through such a configuration, the magnet 51 and the magnetic member 52 or the magnet are attracted and stuck to each other, so that it is possible to secure excellent hermetic sealing performance of the first shell 3 and the second shell 4.

Figure 30:
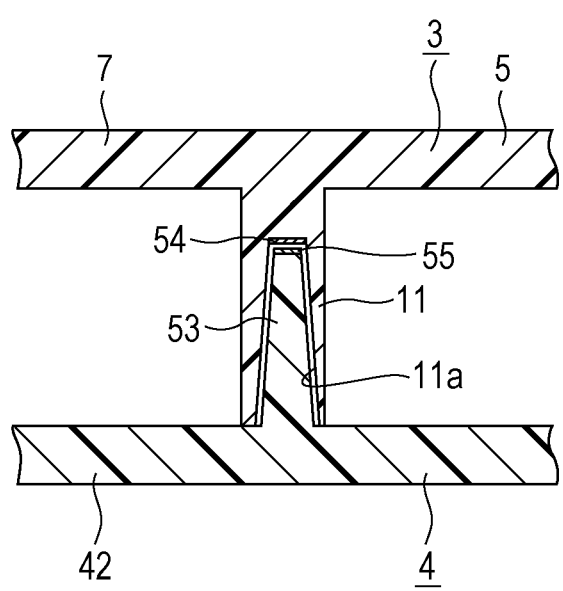
FIG. 30 is an enlarged cross-sectional view illustrating an example where a magnet is attached to one of a center pin and an insertion pin provided at the second shell and a magnetic body or a magnet is attached to the other.

Also, for example, as shown in FIG. 30, a configuration is also acceptable in which a disposition hole 11a is formed in the center pin 11 provided at the first shell 3, an insertion pin 53 which is inserted into the disposition hole 11a is provided at the second shell 4, a magnet 54 is disposed at one of the disposition hole 11a and the insertion pin 53, and a magnetic member 55 or a magnet is disposed at the other. Through such a configuration, the magnet 54 and the magnetic member 55 or the magnet are attracted and stuck to each other, so that it is possible to secure excellent hermetic sealing performance of the first shell 3 and the second shell 4.

As described above, also by using the magnet 51 or 54 and the magnetic member 52 or 55 or the magnet, the displacement structures are made to be a simple structure, so that it is possible to secure excellent hermetic sealing performance of the first shell 3 and the second shell 4 without causing rising of a manufacturing cost. Also, since the center pin 11 functions as the displacement structure, it is possible to reliably secure excellent hermetic sealing performance in the combined state of the first shell 3 and the second shell 4.

Also, it is also possible to secure excellent hermetic sealing performance in the combined state of the first shell 3 and the second shell 4 by using, as a displacement structure, for example, a tension coil spring supported between the lower surface of the base face portion 7 of the first shell 3 and the upper surface of the basal plane portion 42 of the second shell 4.

Also, in the case of providing a displacement structure for securing the hermetic sealing performance of the first shell 3 and the second shell 4, a configuration is also possible in which one of the first shell 3 and the second shell 4 is displaced with respect to the other. In this case, a configuration in which the lighter side out of the first shell 3 and the second shell 4 is displaced is preferable because a driving force during displacement is reduced. In the disc cartridge 1, since the disc-shaped recording media 100, 100, . . . are held in the holding grooves 45e, 45e, . . . of the second shell 4, it is more likely that the first shell 3 becomes lighter than the second shell 4, so that a configuration is preferable in which the first shell 3 is displaced with respect to the second shell 4.

The specific shape and structure of each portion illustrated in the best mode described above are merely to illustrate only an example of an embodiment when carrying out the present invention and the technical scope of the present invention is not interpreted as being limited thereto.

The present application contains subject matter related to that disclosed in Japanese Priority Patent Application JP 2010-119655 filed in the Japan Patent Office on May 25, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A disc cartridge comprising:
a case body in which a plurality of disc-shaped recording media can be stored being arranged in an axial direction of a central shaft inside the case body and which includes a first shell having a base face portion parallel to a recording face of the disc-shaped recording media and a second shell having a basal plane portion parallel to the recording face of the disc-shaped recording media, wherein the first and second shells move toward or away from each other in the axial direction, thereby being combined with or separated from each other,
wherein the second shell is provided with a pair of side face portions which are orthogonal to the basal plane portion, protrude in the axial direction from both end portions of the basal plane portion, extend in a second direction along the end portions of the basal plane portion, and are situated lacing each other, wherein the second direction is substantially perpendicular to the axial direction,
wherein the basal plane portion comprises an elongated thin-walled portion extending in the second direction a distance greater than a distance the thin-walled portion extends in a third direction and having a thinner thickness than the other portions of the basal plane portion, wherein the elongated thin-walled portion is formed at a central portion between the pair of side face portions in the basal plane portion, wherein the third direction is substantially perpendicular to the axial direction and the second direction, and
a bridge member which is attached to span the pair of side face portions is provided, wherein the pair of side face portions are connected to one another by the bridge member.

2. The disc cartridge according to claim 1, wherein a plurality of holding grooves, in which outer circumferential portions of the disc-shaped recording media are inserted, whereby the disc-shaped recording media are held, are formed in each of the inner surfaces of the pair of side face portions.

3. The disc cartridge according to claim 1, wherein:
the second shell is formed from a resin material, and
the bridge member is formed from a metal material.

4. The disc cartridge according to claim 1, wherein the bridge member is provided with a spanning portion, which is disposed between the pair of side face portions, and a pair of bent portions which protrude in a same orthogonal direction from both end portions in an arrangement direction of the side face portions of the spanning portion.

5. The disc cartridge according to claim 1, wherein upper surfaces of the pair of side face portions and an upper surface of the bridge member are located on a same plane.

6. The disc cartridge according to claim 1, wherein a weight of the first shell is less than a weight of the second shell.

7. The disc cartridge according to claim 1, wherein the basal plane portion and the pair of side face portions are integrally formed with each other.

8. The disc cartridge according to claim 1, wherein the first shell comprises a base body and an auxiliary base.

9. The disc cartridge according to claim 8, wherein the auxiliary base is attached to a rear end portion of the base body.

10. The disc cartridge according to claim 8, wherein a shaft-like center pin protrudes downward from a base face portion of the base body.

11. The disc cartridge according to claim 1, wherein the thin-walled portion forms a stepped portion at the central portion of the basal plane portion.

12. The disc cartridge according to claim 1, wherein a thickness of the thin-walled portion gradually decreases as the thin-walled portion goes to the center of the basal plane portion.

13. The disc cartridge according to claim 12, wherein a thickness of the central portion of the basal plane portion is constant.

14. The disc cartridge according to claim 1, wherein the bridge member comprises a spanning portion, at least one bent portion and at least one attached surface portion.

15. The disc cartridge according to claim 14, wherein the at least one attached surface portion of the bridge member is attached to the second shell via fasteners.

16. The disc cartridge according to claim 14, wherein the at least one bent portion comprises a pair of bent portions which protrude in a same orthogonal direction from end portions of the spanning portion of the bridge member.

* * * * *